US011106336B2

(12) United States Patent
Havins

(10) Patent No.: US 11,106,336 B2
(45) Date of Patent: *Aug. 31, 2021

(54) COGNITIVELY OPTIMIZED USER INTERFACE FOR STATIC EQUIPMENT

(71) Applicant: William H. Havins, Abilene, TX (US)

(72) Inventor: William H. Havins, Abilene, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,316

(22) Filed: Dec. 7, 2020

(65) Prior Publication Data

US 2021/0103367 A1      Apr. 8, 2021

Related U.S. Application Data

(63) Continuation-in-part of application No. 16/591,234, filed on Oct. 2, 2019, now Pat. No. 10,885,728.

(51) Int. Cl.
*B60W 50/04*      (2006.01)
*G06F 3/0482*     (2013.01)
*G06F 3/0488*     (2013.01)

(52) U.S. Cl.
CPC ........ *G06F 3/0482* (2013.01); *G06F 3/04886* (2013.01)

(58) Field of Classification Search
CPC . G06F 3/0482; G06F 3/04886; G07C 5/0825; G07C 5/0841; B60K 35/00;
(Continued)

(56) References Cited

U.S. PATENT DOCUMENTS

| 5,764,139 A | * | 6/1998 | Nojima | ................ | B60K 35/00 340/438 |
| 7,872,570 B2 | | 1/2011 | Havins | | |

(Continued)

FOREIGN PATENT DOCUMENTS

| DE | 1462294 A1 | * | 9/2004 |
| GB | 0928254 B1 | * | 9/1996 |
| KR | 2020-0054369 A | * | 5/2020 |

OTHER PUBLICATIONS

In-vehicle displays: Driving information prioritization and visualization Cristina Olaverri-Monreal; Christian Lehsing; Nicole Trubswetter; Cheree Anne Schepp; Klaus Bengler. 2013 IEEE Intelligent Vehicles Symposium (IV) (pp. 660-665).*

(Continued)

*Primary Examiner* — Khoi H Tran
*Assistant Examiner* — Jorge O Peche

(57) ABSTRACT

An apparatus for providing a rapidly perceivable display of vehicular data includes a processor, a sensor interface, a device display, and a memory. The memory contains instructions, which, when executed by the processor, cause the apparatus to obtain, via the sensor interface, vehicle data, determine, based on the vehicle data, a plurality of status datums, determine, for each status datum of the plurality of status datums, a current priority value, and display, on the device display, a hierarchical array. In at least one embodiment, the hierarchical array presents a set of status datums determined to have the highest current priority values of the plurality of status datums. In at least one embodiment, each status datum of the hierarchical array occupies a location in the hierarchical array corresponding to its current priority value.

20 Claims, 17 Drawing Sheets

(58) Field of Classification Search
CPC ........ B60K 2370/167; B60K 2370/152; B60K 2370/1876
See application file for complete search history.

(56) References Cited

U.S. PATENT DOCUMENTS

| | | | | | |
|---|---|---|---|---|---|
| 2006/0066638 | A1* | 3/2006 | Gyde | ................... | G01C 23/00 |
| | | | | | 345/635 |
| 2013/0076787 | A1* | 3/2013 | Mathieu | ................... | B60R 1/00 |
| | | | | | 345/633 |
| 2013/0229370 | A1* | 9/2013 | Shimizu | ............. | G06F 3/04845 |
| | | | | | 345/173 |
| 2015/0010207 | A1* | 1/2015 | Inada | ................ | G06K 9/00845 |
| | | | | | 382/103 |
| 2015/0015457 | A1* | 1/2015 | Takasu | .................. | G02B 27/01 |
| | | | | | 345/7 |
| 2015/0015962 | A1* | 1/2015 | Takasu | ............... | G02B 27/0101 |
| | | | | | 359/630 |
| 2015/0015964 | A1* | 1/2015 | Takasu | ............... | G02B 27/0101 |
| | | | | | 359/630 |
| 2016/0144716 | A1* | 5/2016 | Kim | ...................... | B60K 35/00 |
| | | | | | 345/184 |
| 2016/0159386 | A1* | 6/2016 | Jang | ........................ | B62D 1/06 |
| | | | | | 74/552 |
| 2016/0167514 | A1* | 6/2016 | Nishizaki | ............... | G02B 27/01 |
| | | | | | 345/7 |
| 2016/0267885 | A1* | 9/2016 | Meilinger | ................ | G09G 5/14 |
| 2016/0379422 | A1* | 12/2016 | Kahn | .................... | B60K 35/00 |
| | | | | | 701/36 |
| 2017/0144671 | A1* | 5/2017 | Memani | ............. | G06Q 10/1053 |
| 2017/0336627 | A1* | 11/2017 | Ieda | ................... | G02B 27/0101 |
| 2018/0130449 | A1* | 5/2018 | Jeon | ........................ | G09G 5/14 |
| 2018/0188332 | A1* | 7/2018 | Newman | ............... | B60K 35/00 |
| 2018/0201207 | A1* | 7/2018 | Kim | ........................ | B60R 1/006 |
| 2019/0075203 | A1* | 3/2019 | Suzuki | ................... | G08G 1/144 |
| 2019/0251840 | A1* | 8/2019 | Kukimoto | ............. | B60K 35/00 |

OTHER PUBLICATIONS

A concept for consistent and prioritized presentation of surgical information Erik Schreiber;Stefan Franke; Richard Bieck;Thomas Neumuth 2016 IEEE 18th International Conference on e-Health Networking, Applications and Services (Healthcom).*

Havins, Ph.D., William H., Application of Human Factors and Cognitive Neuroscience Principles in the Design of Vehicle Information Displays, Commercial Vehicle Engineering Congress, Sep. 13, 2011, 17pgs., 2011-01-2256, SAE International.

* cited by examiner

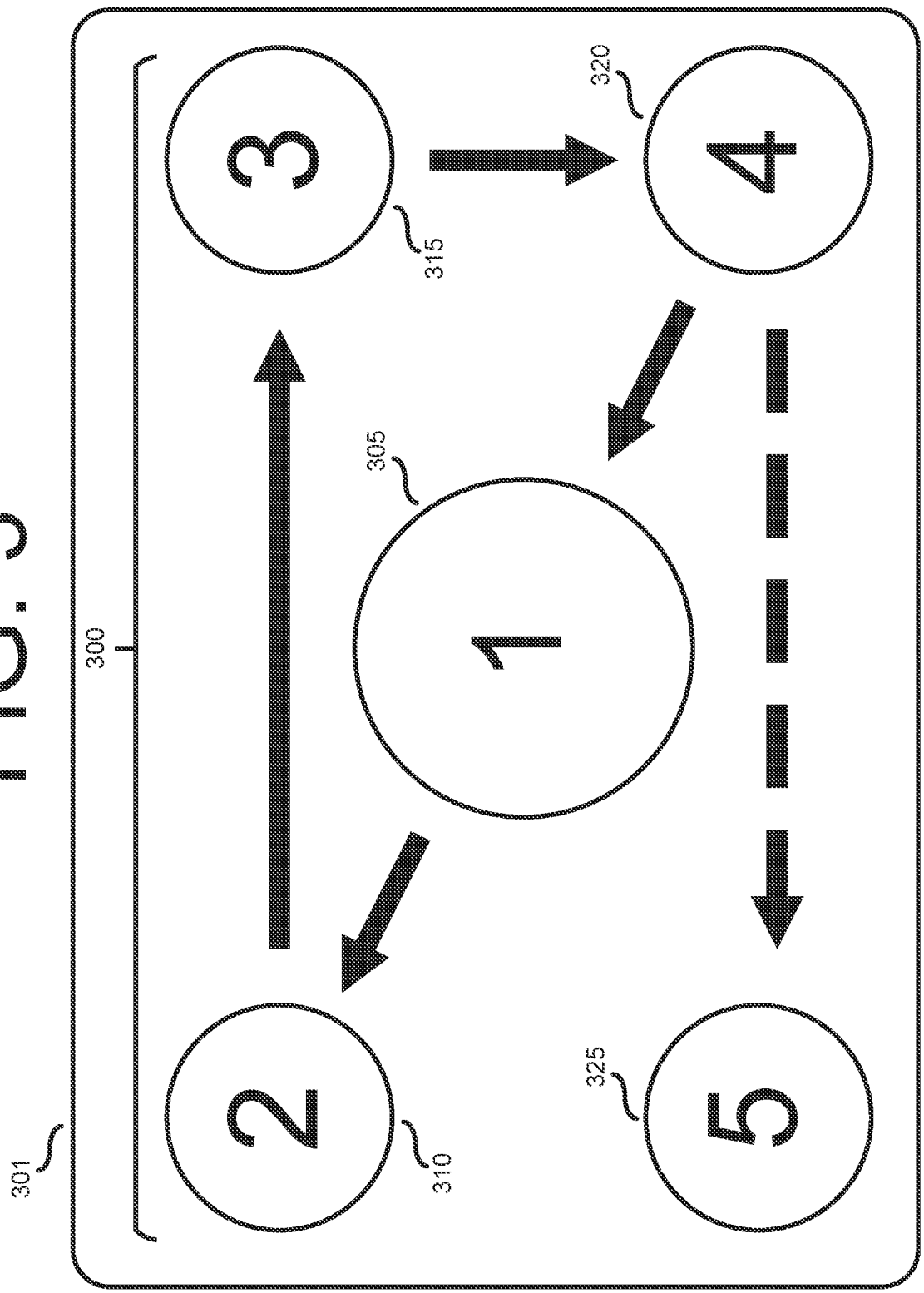

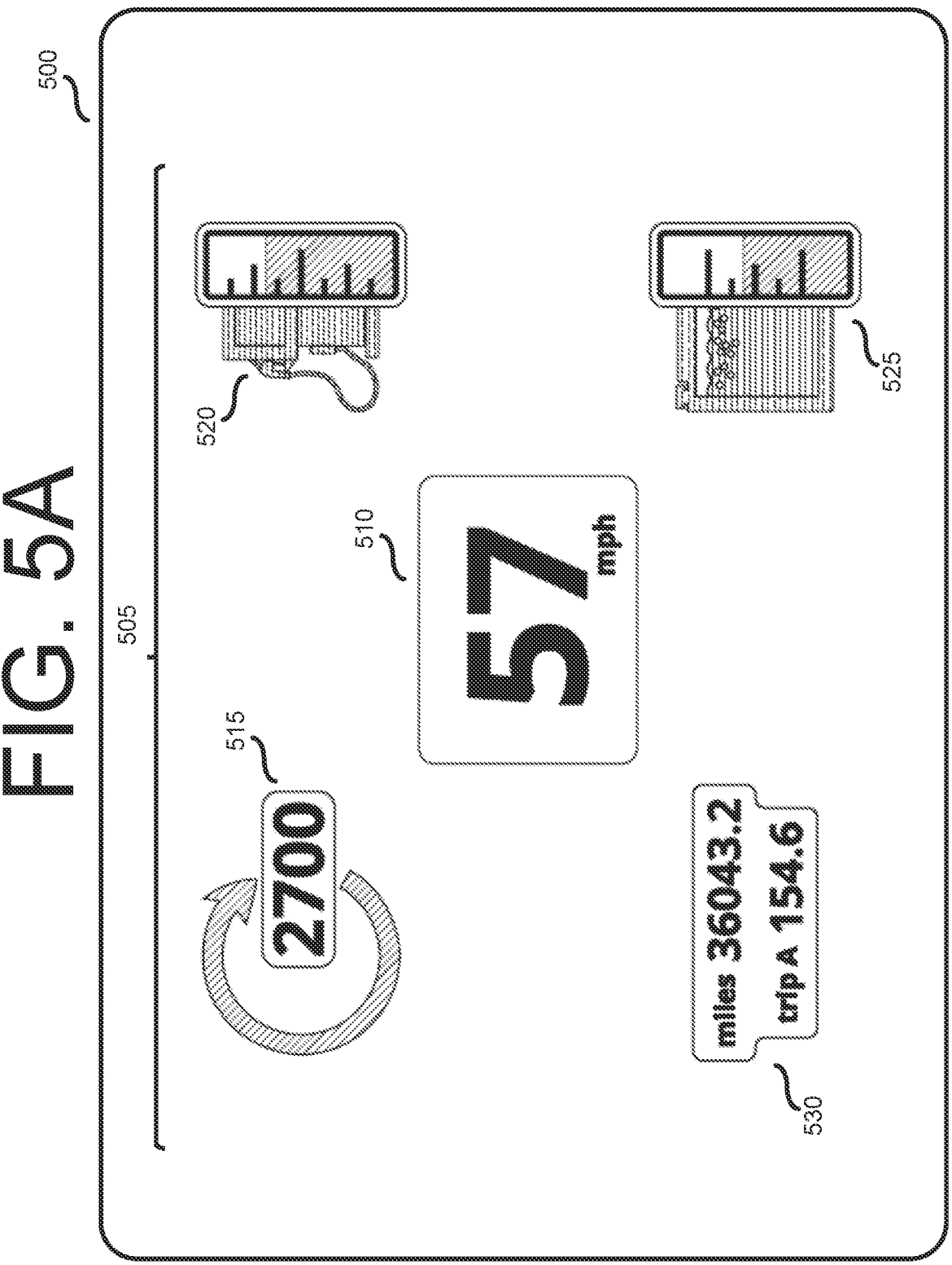

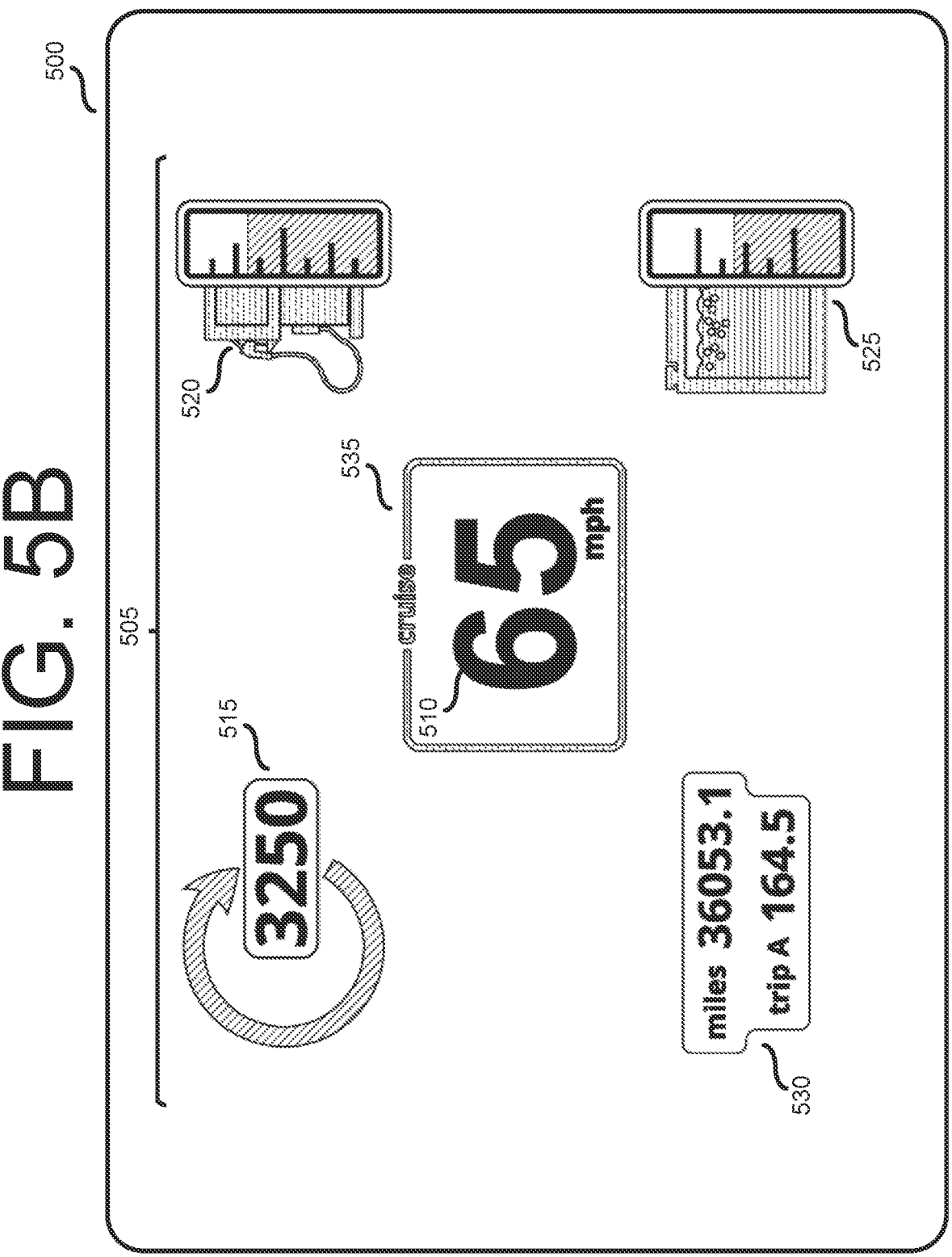

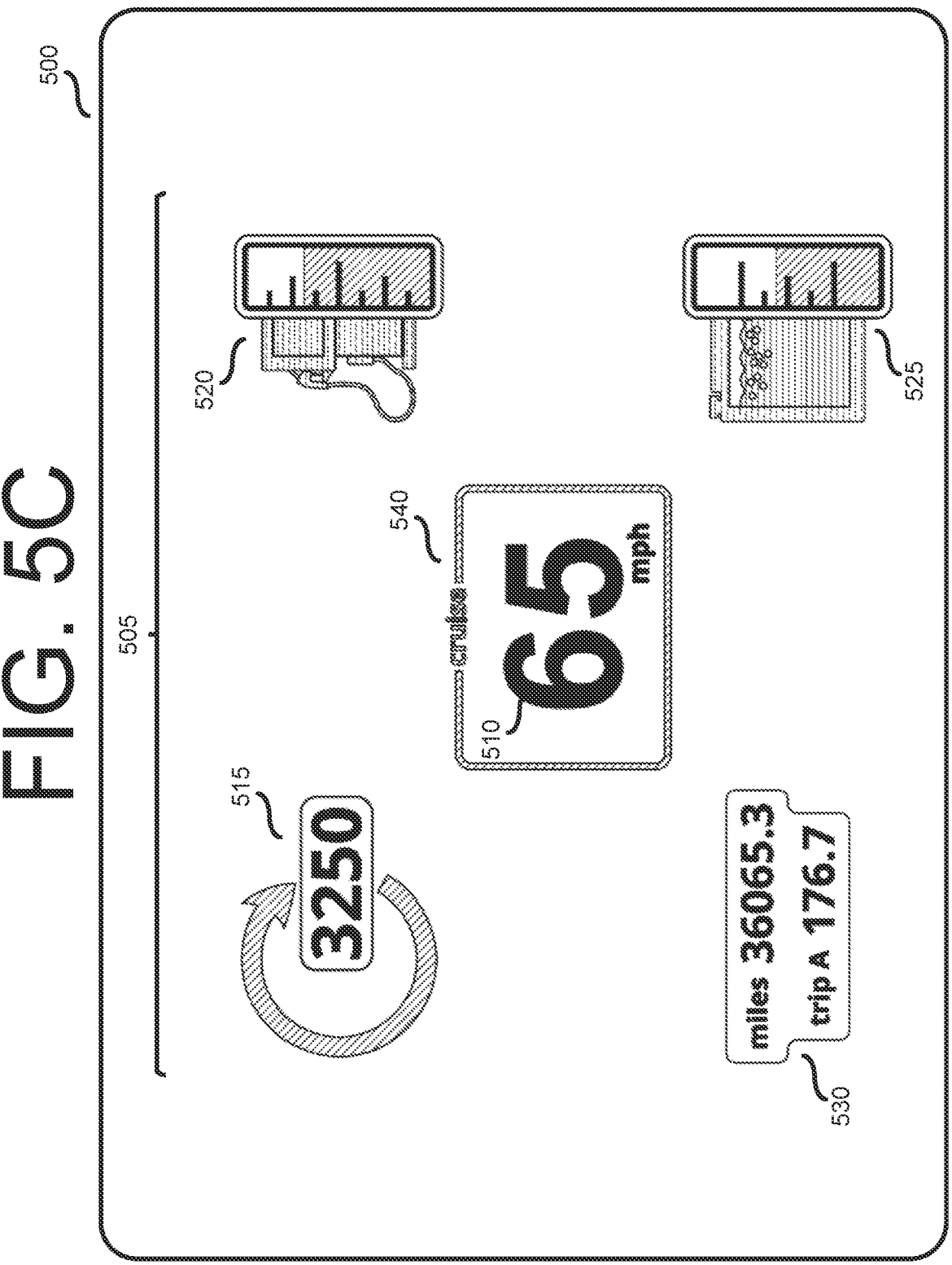

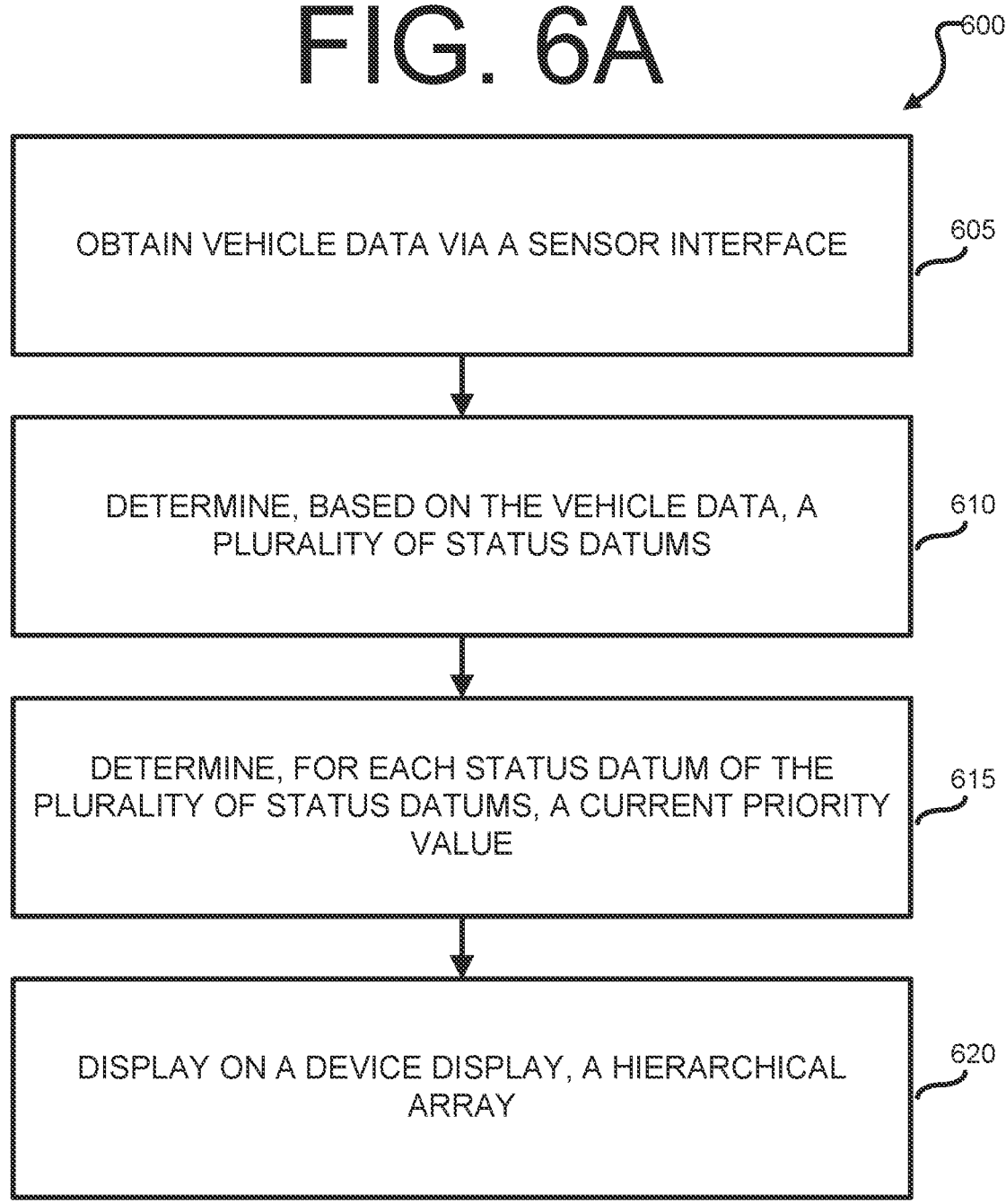

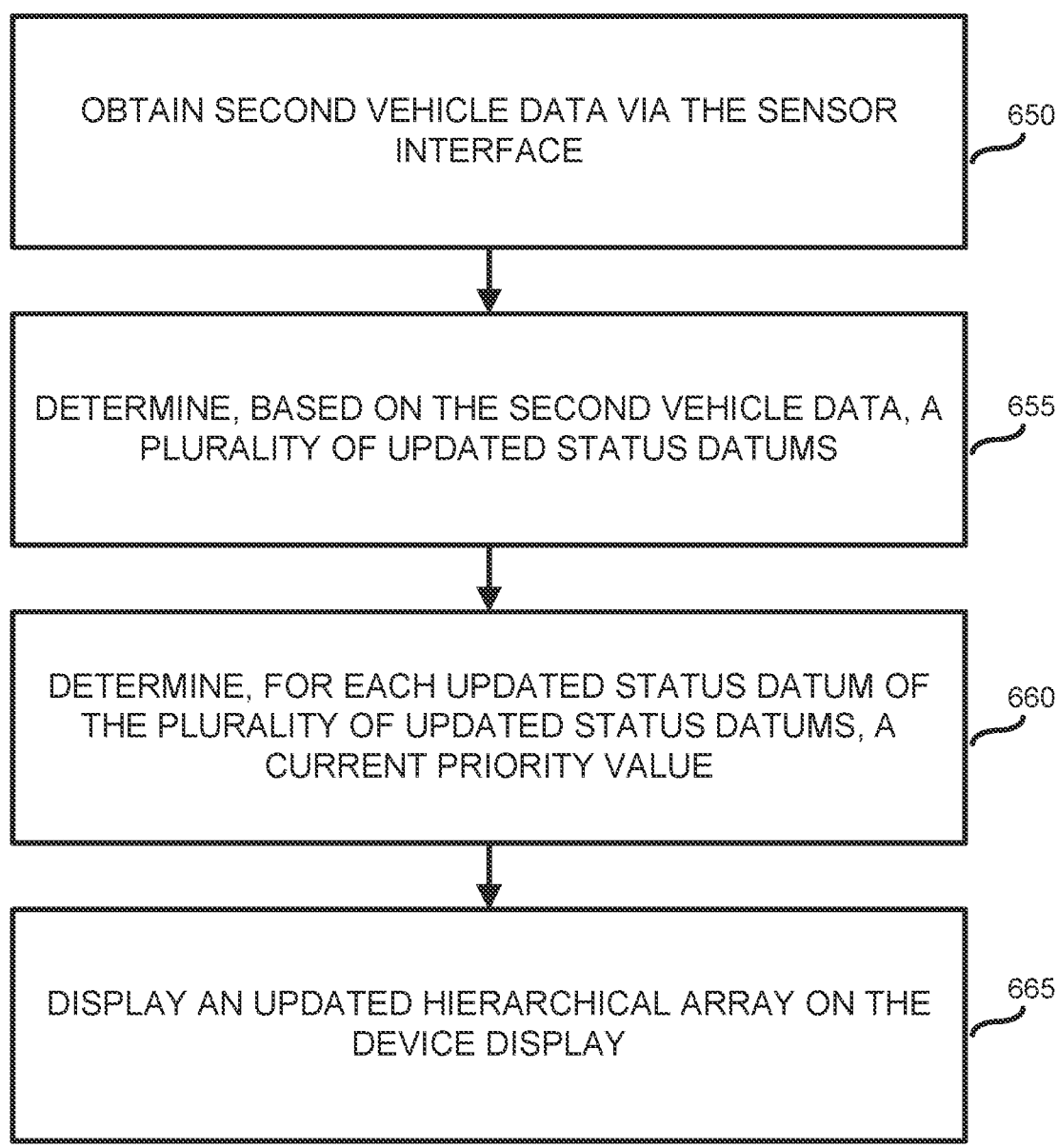

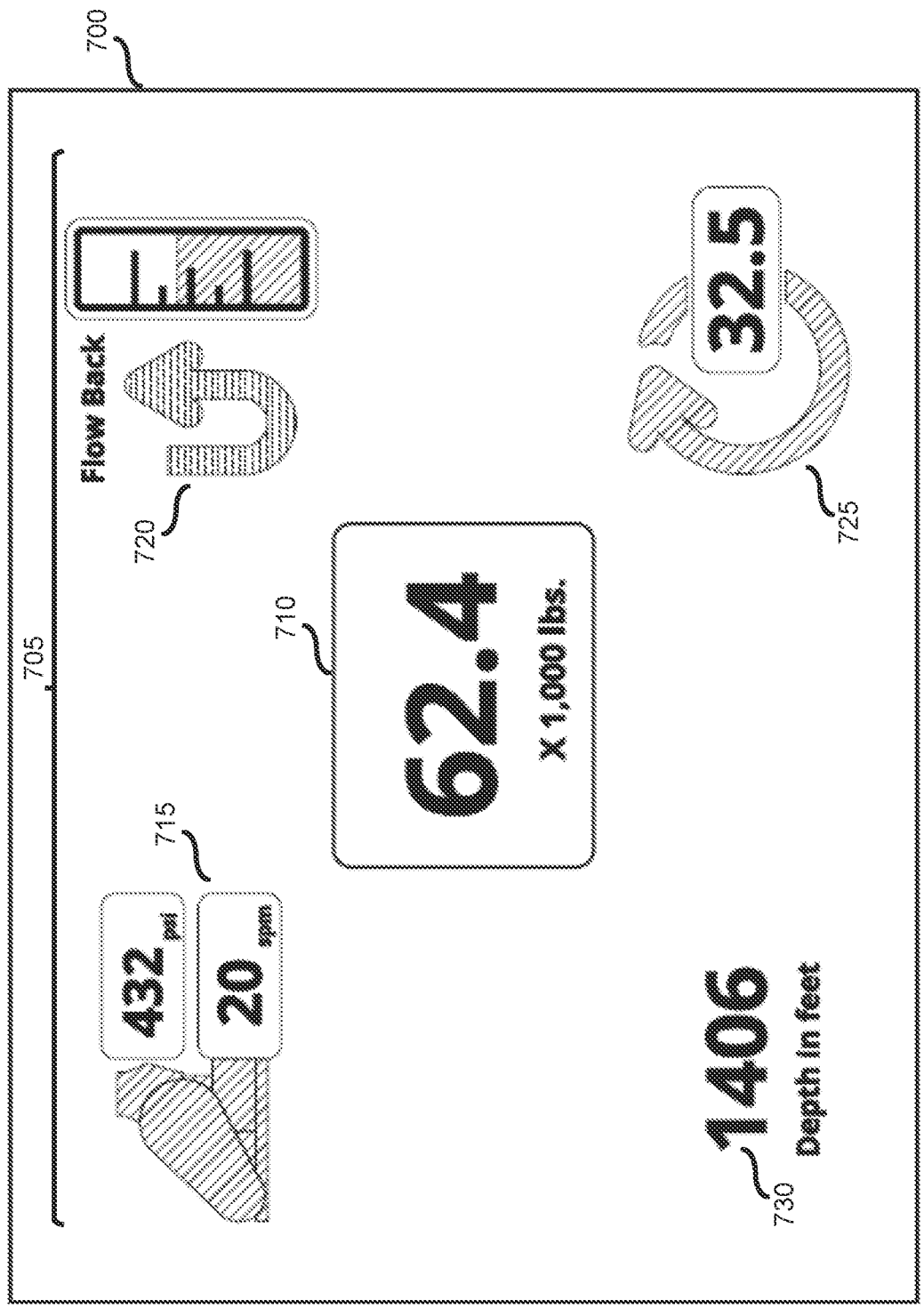

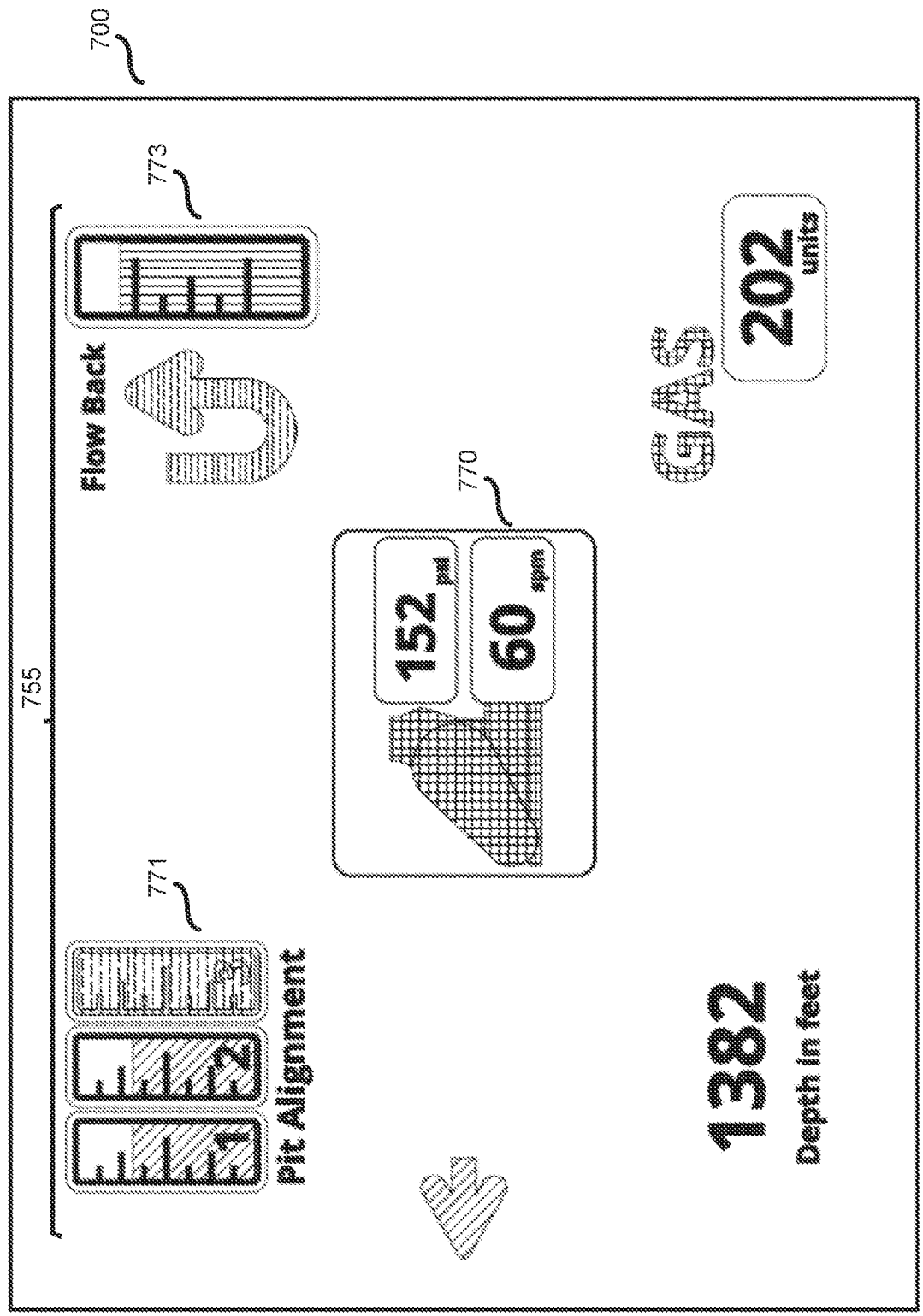

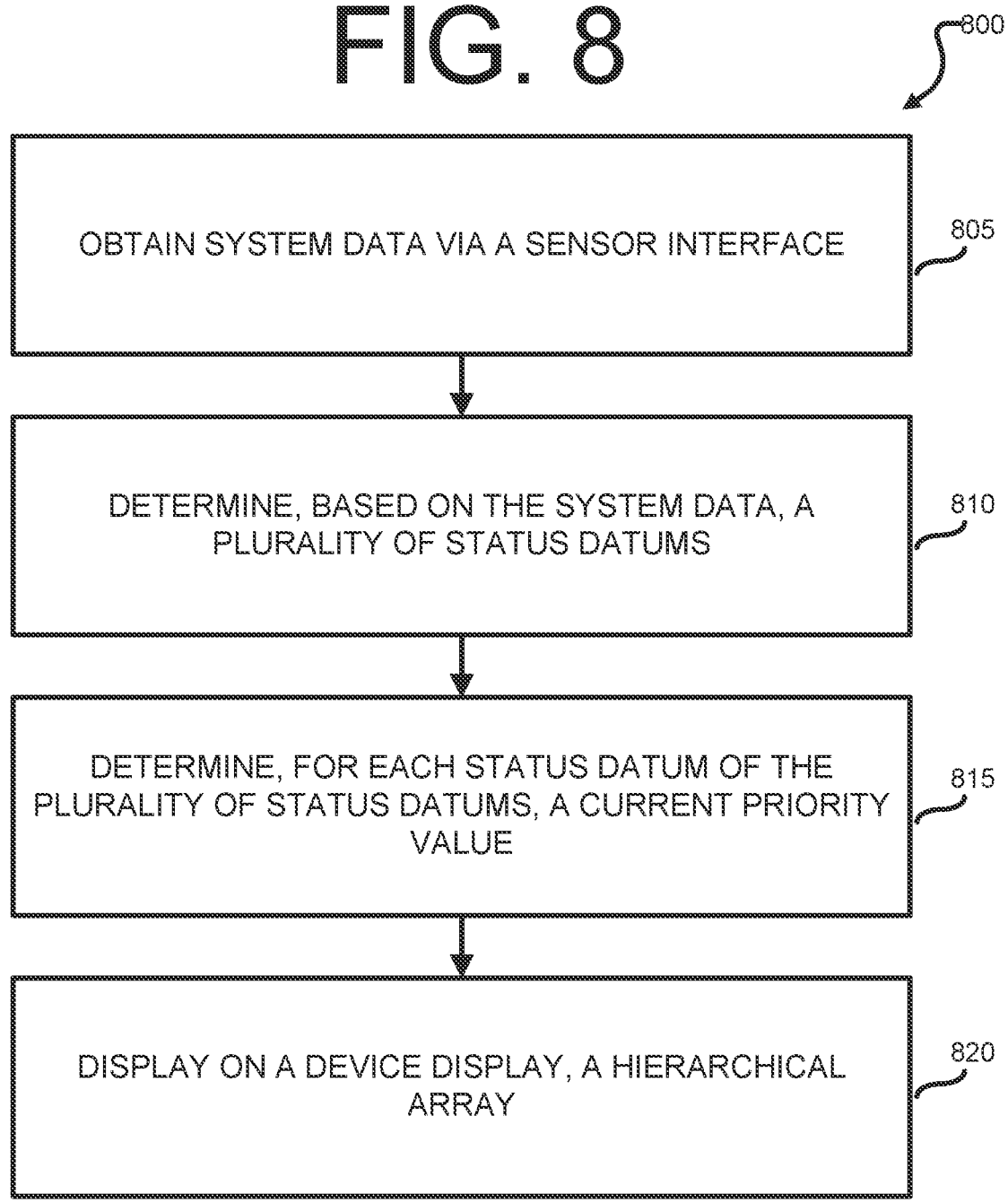

COGNITIVELY OPTIMIZED USER INTERFACE FOR STATIC EQUIPMENT

CROSS-REFERENCE TO RELATED APPLICATION AND CLAIM OF PRIORITY

The present application claims priority under 35 U.S.C. § 120 as a continuation-in-part of U.S. application Ser. No. 16/591,234 entitled, "COGNITIVELY OPTIMIZED USER INTERFACE FOR MOTOR VEHICLE" filed Oct. 2, 2019, which is hereby incorporated by reference in its entirety.

TECHNICAL FIELD

This disclosure relates generally to methods and apparatus for providing vehicle and system status information to drivers of operators of attention intensive apparatus. Specifically, this disclosure relates to a cognitively optimized user interface for attention intensive apparatus, including, without limitation a motor vehicle, and certain static apparatus.

BACKGROUND

Operating a motor vehicle, such as a car, boat, or motorcycle, as well as operating certain other attention intensive apparatus has become an increasingly cognitively intense activity. In the case of the motor vehicle, this is due, in part, to technological and demographic trends which have increased the volume of both relevant and distracting visual information competing for motor vehicle operators' attention. For example, the consequences of previously urban populations moving to the suburbs and commuting to places of work via multi-lane freeways include individual drivers having to perceive and process the activity of a large number of other fast-moving vehicles. From a cognitive perspective, driving quickly on a multi-lane freeway requires paying attention to a greater number of dynamic objects than driving at lower speeds on a one or two lane road, and thus places greater demands that the driver's attention be, to the greatest extent possible, focused on the road, river or other field of travel.

Similarly, advances in technology, such as GPS devices with screens providing navigational and traffic information, as well as mobile communication devices, such as smartphones, have significantly increased the volume of distracting visual information presented to motor vehicle operators. While traffic regulations have recognized the dangers of texting while driving, it appears impossible to legislate away all of the potential distractions to drivers presented by other technologies (for example, GPS devices and large-scale LED displays operating as animated billboards).

Beyond maintaining an awareness of the other vehicles on the road, the cognitive demands of lawful and safe motor vehicle operation include periodically perceiving and processing visual information (for example, speed and engine status information) relating to the status of the vehicle, wherein the information is typically provided on one or more user interfaces (for example, an instrument cluster above the steering column) of the vehicle. To get vehicle information, a user typically needs to temporarily shift their attention and gaze away from the road to the user interface, identify visual information relating to the vehicle's status, and interpret the visual information of current interest. Thus, for some period of time, a user's attention is necessarily diverted from events on the road to take in content presented through the user interface. Further, the amount of time a user needs to divert their attention from the road to take in and process visual information of a vehicle's status can depend heavily upon the design and operation of the apparatus presenting the information. Specifically, the amount of time required for perceiving and processing visual information on a conventional dashboard instrument cluster is higher than it needs to be, due to the fact that the static layout and presentation of information creates cognitive bottlenecks which slow down perception and understanding of information of immediate interest.

While significant advances have been made in certain safety apparatus for motor vehicles, these benefits do not extend uniformly across the range of possible consequences of lapses in motor vehicle operator attention. As a concrete example, the presence or absence of seatbelts or airbags in an automobile has no effect on a motorcyclist's likelihood of surviving a collision between a motorcyclist and a distracted driver of said automobile. Instead, in this example, the motorcyclist's odds of survival are principally dependent on the quality of the driver's attention to the road, and in particular, awareness of the motorcyclist's presence on the road.

The case of certain attention-intensive static apparatus, such as well drilling equipment in the oil and gas industry, power plants, and other multi-system systems presents related cognitive challenges, wherein operators have to make high stakes decisions based on information provided across a decentralized and sprawling set of instruments. In many cases, the user interfaces for such systems comprise a mixture of legacy instruments (for example, analog gauges) along with a heterogeneous assortment of displays (for example, octet LEDs, green screen monitors, LCD displays, and computer monitors) from incremental upgrades over the service life of the apparatus. In such cases, the large number of sources of potentially relevant information and spatial dispersion of sources of relevant information, can significantly add to the challenge of quickly making a correct decision involving a critical system. Research in the field of cognitive neuroscience, for example, research undertaken by the inventor and Dr. Angelika Dimoka has shown that increased levels of information can cause an individual to make worse decisions than the individual would have made with a more reduced, better managed, corpus of situational information.

In view of the above, developing user interfaces which present visual information associated with the present state of attention-intensive apparatus, such as a motor vehicle in ways that alleviate the above-described cognitive bottlenecks, and minimize the time in which an operator's attention is diverted from critical attention points, such as the road (in the case of motor vehicles) remains a source of technical challenges and opportunities for improvement in the safety of motor vehicles and other attention-intensive apparatus.

SUMMARY

This disclosure provides a cognitively optimized user interface for static equipment, and methods for providing same.

In a first embodiment, an apparatus for providing a rapidly perceivable display of vehicular data includes a processor, a sensor interface, a device display, and a memory. The memory contains instructions, which, when executed by the processor, cause the apparatus to obtain, via the sensor interface, vehicle data, determine, based on the vehicle data, a plurality of status datums, determine, for each status datum of the plurality of status datums, a current priority value, and display, on the device display, a hierarchical array. In at least one embodiment, the hierarchical array presents a set of status datums determined to have the highest current priority values of the plurality of status datums. In at least one embodiment, each status datum of the hierarchical array occupies a location in the hierarchical array corresponding to its current priority value.

In a second embodiment, a method of providing a rapidly perceivable display of vehicular data, includes, at an apparatus comprising a processor, a sensor interface, a device display and a memory, obtaining, via the sensor interface, vehicle data. The method further includes determining, based on the vehicle data, a plurality of status datums, determining, for each status datum of the plurality of status datums, a current priority value, and displaying a hierarchical array on the device display. In at least one embodiment, the hierarchical array presents a set of status datums determined to have the highest current priority values of the plurality of status datums, and each status datum of the hierarchical array occupies a location in the hierarchical array corresponding to its current priority value.

In a third embodiment, a non-transitory computer readable medium includes program code, which when executed by a processor of an apparatus comprising a sensor interface and a device display, causes the apparatus to obtain, via the sensor interface, vehicle data, determine, based on the vehicle data, a plurality of status datums, determine, for each status datum of the plurality of status datums, a current priority value, and display, on the device display, a hierarchical array. According to certain embodiments, the hierarchical array presents a set of status datums determined to have the highest current priority values of the plurality of status datums, and each status datum of the hierarchical array occupies a location in the hierarchical array corresponding to its current priority value.

In a fourth embodiment, an apparatus for providing a rapidly perceivable display of system data includes a processor, an interface to a controlled system, a display and a memory. The memory contains instructions, which, when executed by the processor, cause the apparatus to obtain system data from the controlled system via the interface, determine, based on the system data, a plurality of status datums, determine, for each status datum of the plurality of status datums, a current priority value, and display, on the display, a hierarchical array. Additionally, the hierarchical array presents a set of status datums determined to have the highest current priority values of the plurality of status datums. The hierarchical array comprises a first location at a center of the hierarchical array. Each status datum of the hierarchical array occupies a location in the hierarchical array corresponding to its current priority value. A status datum with the highest current priority occupies the first location at the center of the hierarchical array, and status datums with lower priorities occupy locations along a path around the first location in descending order of priority.

In a fifth embodiment, a method includes, at an apparatus having a processor, an interface to a controlled system, a display and a memory, obtaining system data from the controlled system via the interface. The method further includes determining, based on the system data, a plurality of status datums, determining, for each status datum of the plurality of status datums, a current priority value, and displaying, on the display, a hierarchical array. The hierarchical array presents a set of status datums determined to have the highest current priority values of the plurality of status datums. The hierarchical array has a first location at a center of the hierarchical array. Each status datum of the hierarchical array occupies a location in the hierarchical array corresponding to its current priority value. A status datum with the highest current priority occupies the first location at the center of the hierarchical array, and status datums with lower priorities occupy locations along a path around the first location in descending order of priority.

In a sixth embodiment, a non-transitory, computer-readable medium contains instructions, which, when executed by a processor cause an apparatus including a processor, an interface to a controlled system, and a display, to obtain system data from the controlled system via the interface. When executed by the processor, the instructions further cause the apparatus to determine, based on the system data, a plurality of status datums, determine, for each status datum of the plurality of status datums, a current priority value and display, on the display, a hierarchical array. The hierarchical array presents a set of status datums determined to have the highest current priority values of the plurality of status datums. The hierarchical array comprises a first location at a center of the hierarchical array. Each status datum of the hierarchical array occupies a location in the hierarchical array corresponding to its current priority value. A status datum with the highest current priority occupies the first location at the center of the hierarchical array, and status datums with lower priorities occupy locations along a path around the first location in descending order of priority.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example of an array of visual information and perception and processing paths by which human beings have been observed to seek visual information of current interest;

FIGS. 5A through 5C provide an example illustrating how certain embodiments according to this disclosure provide a cognitively optimized display of information related to accessory functionalities during "normal" operation of a motor vehicle;

FIGS. 6A and 6B illustrate examples of operations of methods for providing a rapidly perceivable display of vehicular data according to various embodiments of this disclosure;

FIGS. 7A-7D provide an example illustrating how certain embodiments according to this disclosure provide a cognitively optimized display of information for attention-intensive static apparatus; and FIG. 8 illustrates an example of operations of a method for providing a cognitively optimized display of system data for a static apparatus, according to various embodiments of this disclosure.

DETAILED DESCRIPTION

Figure 1:
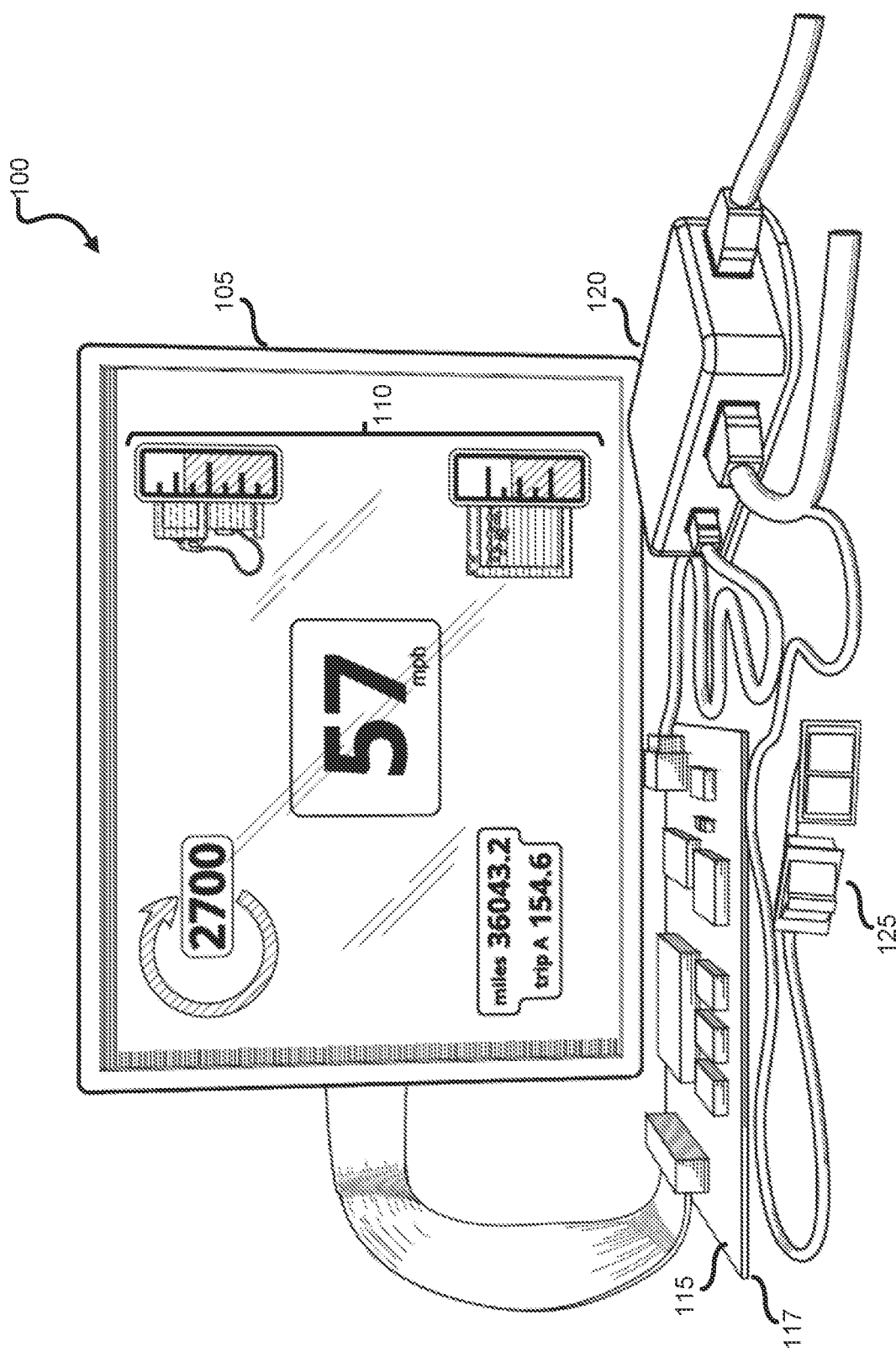
FIG. 1 illustrates an example of a system for providing a rapidly perceivable display of vehicular data according to certain embodiments of this disclosure.

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

As noted previously, road users' safety depends in part on the ability of motor vehicle operators to maintain substantially uninterrupted focus on events happening in the road. At the same time, to ensure that they are operating the vehicles in a safe and lawful manner, motor vehicle operators must periodically divert their attention from the road to obtain visual information regarding the status of their vehicle (for example, whether the vehicle is travelling above the speed limit) provided by a user interface of the vehicle.

In many cases, vehicle user interfaces present information in ways that are at odds with how human beings actually perceive and process visual information, and as such, unnecessarily extend the duration of the intervals during which motor vehicle operators need to divert their attention from the road to obtain information regarding the current status of a vehicle. As an example, consider a cluster of analog instruments, wherein each instrument presents the value of a parameter of interest (for example, vehicle speed, engine rpm or engine temperature) through a needle which points to a numbered scale on a background dial. In this example, to obtain a piece of information of interest, a viewer must, at a minimum, locate the relevant instrument within a cluster of instruments, read at least some of the numbers on the scale, and associate the position of the needle with a value on the scale. Additionally, the operator needs to devote cognitive attention to comprehending whether the value is associated with a condition of interest, such as an excess of vehicle speed or more complicated cases, such as a lack of oil pressure.

Further, given the complexity of a modern motor vehicle, a user interface can contain multiple instruments and displays to provide a user with information (for example, battery levels, oil pressure) covering a wide range of contingencies and error conditions. While neither relevant nor useful to the operator during normal operation of the motor vehicle, the information provided by such instruments is persistently present on the dashboard and contributes to the cognitive complexity (and time required) of obtaining vehicle information of present interest to the operator. From a safety perspective, the added cognitive processing time associated with the static organization and surfeit of information provided by such user interfaces is undesirable, as it increases the likelihood of an operator's attention being in the wrong place (e.g., not on the road) at a critical moment.

Advantageously, certain embodiments according to this disclosure provide a user interface whose organization and feature appearance are dynamic, and are configured to present vehicle status information in a way that comports with how humans process arrays of visual information. Accordingly, certain embodiments according to this disclosure present vehicle status information in a way that removes cognitive bottlenecks associated with scanning a static array of information, thereby reducing the amount of time a user requires to perceive and process visual information as to the current status of her vehicle.

Specifically, and as described in greater detail herein, certain embodiments according to this disclosure provide novel mechanisms for categorizing, organizing and displaying visual information associated with vehicle status data on a single display (for example, a flat screen organic light emitting diode ("OLED") display or liquid crystal display ("LCD")). Various embodiments according to this disclosure facilitate rapid perception of vehicle status data by applying well-researched cognition and human factors principles to organizing and presenting visual information associated with the vehicle status data. Accordingly, some embodiments facilitate rapid comprehension by simplifying the cognitive demands associated with a user ingesting the visual information providing the vehicle status data.

FIG. 1 illustrates an example of a system 100 for providing a rapidly perceivable display of vehicular or other system data according to certain embodiments of this disclosure.

Referring to the non-limiting example of FIG. 1, system 100 is configured to be installed in a static or moving attention-intensive apparatus, such as a motor vehicle (for example, a car, truck, boat, or motorcycle) in lieu of a traditional instrument cluster. According to some embodiments, system 100 can be provided in a motor vehicle as original equipment to the vehicle (i.e., from the factory), or as an aftermarket upgrade to replace an existing information system. Additionally, system 100 may be retrofitted to the control apparatus of certain static apparatus, including, without limitation, the control room of a power plant, a drilling platform, or the like.

According to various embodiments, system 100 comprises a display 105 for displaying one or more status datums providing a visual indication of an aspect of the current status of the apparatus (such as a motor vehicle) as part of a hierarchical array 110 (for example, array 300 in FIG. 3) presented on display 105. According to some embodiments, hierarchical array 110 facilitates rapid comprehension of vehicle and system status data by actively prioritizing status datums according to the operational context (for example, if there is nothing wrong with the oil pressure of the vehicle, not displaying a datum associated with oil pressure status in a way that competes with a more important datum, such as current speed, for the operator's attention) of the apparatus or motor vehicle. According to some embodiments, display 105 is a flat screen display which is illuminated or otherwise provides sufficient image contrast to be reliably visible to an operator. Examples of display technologies suitable for use in display 105 include, without limitation, OLED displays, LED displays, and electrophoretic displays (with a backlight to be visible at night).

As shown in the illustrative example of FIG. 1, display 105 is communicatively connected to a controller 115, which in this illustrative example, is embodied on board 117. According to various embodiments, controller 115 comprises a microprocessor-based (for example, a computing platform running on the IOS® or ANDROID® operating systems) or microcontroller-based (for example, a low power 16-bit microcontroller unit, such as a processor in the PIC24F family by Microchip Technology, Inc.) capable of obtaining sensor and system data from sensors (for example, a vehicle speed sensor, such as GENERAL MOTORS® Part No. 24232088) of the apparatus of the motor vehicle, determining for each item of sensor and system data obtained, an appropriate status datum, and determining for each status datum a priority in hierarchical array 110. Depending on the design parameters of the system and other functionalities to be provided on display 105, controller 115 may be a more fully featured computing platform, with processing power sufficient to support other applications (for example, video playback in a parked car, data logging or a navigation system) provided on display 105. In other embodiments, the design parameters of the system may prioritize minimizing component costs and or energy use, and a controller 115 may be embodied as a microcontroller based system. In various embodiments, system 100 comprises an interface hub 120, which is configured to provide a point of connection between the sources of system data from a controlled system (for example, vehicle status sensors) and system 100. According to some embodiments, interface hub 120 comprises hardware (for example, analog-to-digital converters or protocol converters to convert sensor data from a native vehicle protocol (for example, controller area network ("CAN bus") protocol, to protocols used by controller 115)), for normalizing status sensor data for further processing by controller 115.

According to certain embodiments, system 100 further includes one or more user input devices 125. In some embodiments (for example, as shown in the figure), user input devices 125 comprise switches for rapid, intuitive control (to minimize the degree of user distraction) of one or more functionalities of system 100. According to certain embodiments, user input devices 125 include one or more mode switches allowing a user to switch between measurement units (for example, between imperial and metric system units), or if the vehicle context permits (for example, if the engine is not on) between different operational modes of display 105. In one non-limiting example, user input device 125 may permit a user to switch between displaying hierarchical array 110, and another display, such as a diagnostic display comprising data drawn from the vehicle's electronic control unit (ECU), or a checklist of tasks or job parameters for the controlled system.

Figure 2:
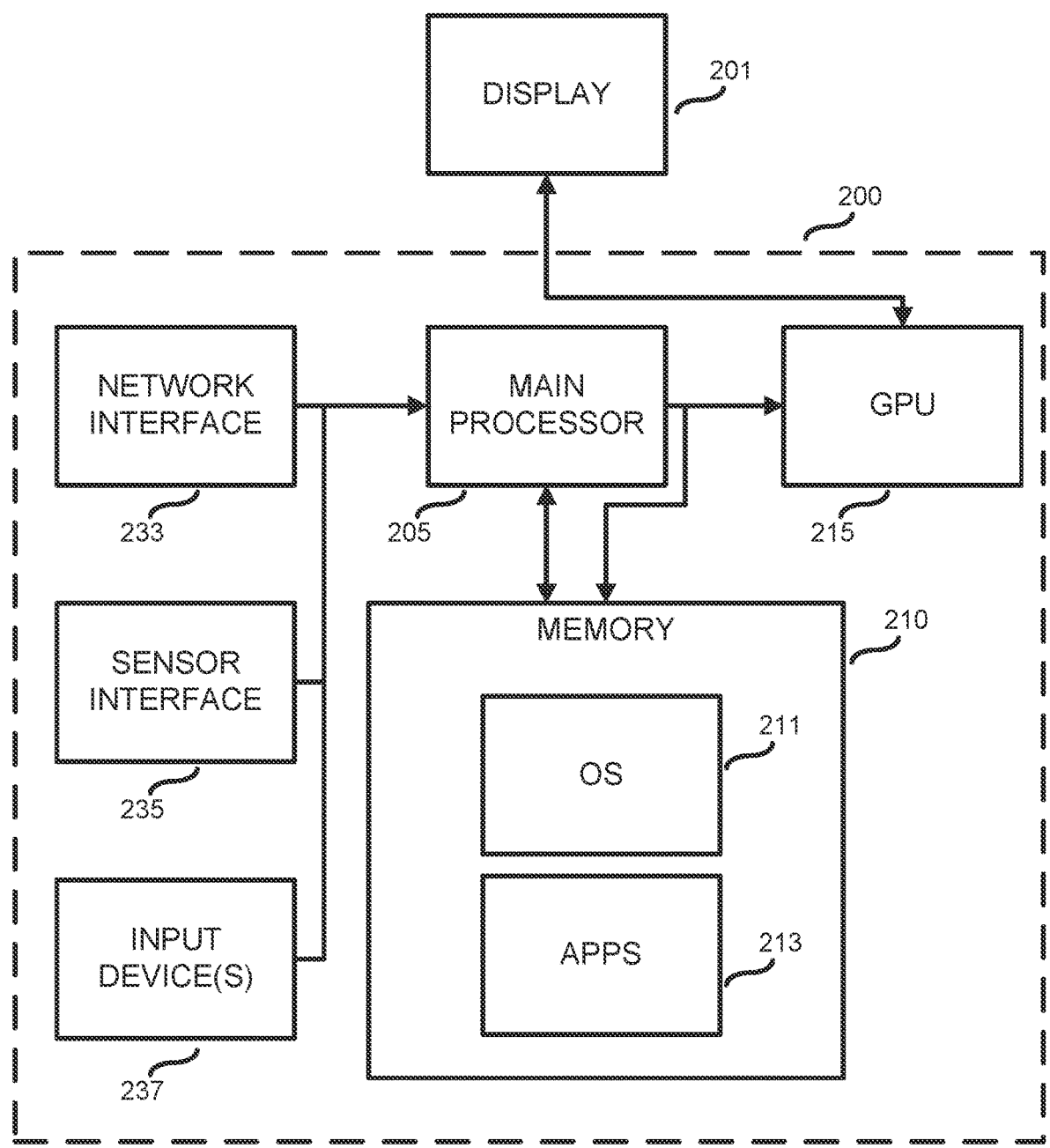
FIG. 2 illustrates, in block diagram format, an example of a controller for providing a rapidly perceivable display of vehicular data on a display according to various embodiments of this disclosure.

FIG. 2 illustrates, in block diagram format, an example of a controller 200 (for example, controller 115 in FIG. 1) for providing a rapidly perceivable display of system data (for example, vehicular data) of a static or moving attention-intensive apparatus on a display 201 according to various embodiments of this disclosure.

Referring to the non-limiting example of FIG. 2, controller 200 comprises one or more main processors 205 capable of reading and executing instructions stored in a non-transitory memory 210 for obtaining vehicle data from one or more of interfaces 233 and 235, and in certain embodiments, receive inputs from input devices 237.

As noted elsewhere in this disclosure, in certain embodiments, main processor 205 comprises a power-efficient microcontroller. According to certain embodiments, display 201 (for example, display 105 in FIG. 1) and controller 200 are provided through a common apparatus (for example, a tablet computer), and main processor 205 is the CPU of the device. In certain embodiments, main processor 205 is a CPU (for example, an INTEL ATOM® series processor) intended for use in tablet computers and other devices integrating a display, processor, and a host of other device functionalities. In certain embodiments, main processor 205 has the computational power and control logic to implement a graphics pipeline for rendering graphics for display on display 201. In some embodiments, main processor 205 does not render graphics itself, but rather passes image vectors, or other representations of visual information to be displayed to a graphics processing unit 215 for display. In various embodiments, to conserve computational resources, content for display on display 201 is not separately rendered, but rather, fetched as pre-rendered content from memory 210.

Referring to the non-limiting example of FIG. 2, controller 200 comprises a one or more instances of memory 210. According to certain embodiments, memory 210 comprises one or more transitory memories (for example, random access memory (RAM)), to support main processor 205. In some embodiments, the one or more non-transitory memories provide a buffer for system data obtained from one or more of network interface 233 or sensor interface 235.

According to certain embodiments, memory 210 further comprises one or more non-transitory memories (for example, a solid state drive or other non-transitory data storage) comprising one or more of an operating system 211, and applications 213. According to certain embodiments, operating system 211 provides a logical framework for executing, and making resources of controller 200 available to applications 213. In some embodiments, operating system 211 is a lightweight, microcontroller-oriented operating system, such as VXWORKS®. In other embodiments, for example, where main processor 205 is comparatively more powerful, operating system 211 is a more resource-intensive, but feature-richer operating system, such as IOS®, ANDROID® or embedded LINUX. In some embodiments, applications 213 comprise program code, which when executed by main processor 205, cause the apparatus to perform operations for providing a rapidly perceivable display of data according to various embodiments of this disclosure.

In various embodiments according to this disclosure, controller 200 comprises one or more graphics processing units 215, which are capable of rendering images (for example, a plurality of status datums arranged in a hierarchical array) for display on display 201. Depending on embodiments, GPU 215 is integral with main processor 205, or elsewhere implemented as a separate chip.

Referring to the non-limiting example of FIG. 2, in certain embodiments, controller 200 includes a network interface 233 which is configured to communicatively connect controller 200 to one or more networks (for example, the internet, or a local area network) via a networking protocol (for example, the 5G, WI-FI, or BLUETOOTH LOW ENERGY® ("BLE") protocols). In this way, network interface 233 provides an interface for, as a non-limiting example, receiving updates for applications 213 or exporting system data or vehicle sensor data to external systems.

In various embodiments according to this disclosure, controller 200 further comprises one or more sensor interfaces 235, which are configured to, at periodic intervals, obtain system data from a controlled system, whether a motor vehicle or static system. Examples of systems from which system data can be obtained by sensor interfaces 235 include, without limitation, engine rev meters, or temperature sensors on critical components, such as transmissions and cooling systems. With the increasing computerization of vehicle and other controlled systems, in particular in electric cars, many, if not all of the monitored systems of a motor vehicle are networked, and sensor interface 235 is provided as part of network interface 233.

According to various embodiments, controller 200 further comprises, or is communicatively connected to, one or more input devices 237 (for example, user input devices 125 in FIG. 1). Input devices 237 comprise one or more interface apparatus (for example, switches, knobs, or designated regions of a touchscreen provided in display 201) configured to receive user control commands specific to a status user display provided by controller 200 through display 201. Examples of input devices 237 include, without limitation, a "mode switch" for toggling between units of measurement, or controls for adjusting parameters of the display, such as brightness and status datum size.

FIG. 3 illustrates an example of an array of visual information and perception and processing paths by which human beings have been observed to seek visual information of immediate interest.

Referring to the non-limiting example of FIG. 3, an array 300 of five items of visual information (for example, a cluster of icons on a display, a set of objects on a tray, etc.), is represented in the figure. In this illustrative example, the items of array 300 are situated within a region defined by a boundary 301, which, in various embodiments, corresponds to a physical boundary, for example, a boundary provided by the edge of a screen, a picture frame, or the area of a sheet of paper. As shown in this illustrative example, array 300 comprises five (5) items, at least one of which provides visual information (for example, a number associated with an engine speed, or a color, such as of a necktie that matches an outfit of clothes) which a viewer is seeking out.

Human factors research, such as set forth in "Application of Human Factors and Cognitive Neuroscience Principles in the Design of Vehicle Information Displays" (2011, Society of Automotive Engineers Paper No. 2011-01-2256), indicates the presence of a "center of gravity" effect in the search patterns by which humans scan arrays for visual information of interest. Specifically, research indicates that, when presented with an array of visual information, an individual will begin her search for information of interest by training her gaze at a point (sometimes referred to as the "center of gravity") along the physical midline of the array. If the visual information of interest is at the center of gravity, the search, or scan for the desired visual information ends there, and typically, no further time is spent scanning or processing information elsewhere in the array. Specifically, the "center of gravity" effect has been robustly supported, for example, by studies that demonstrate how reaction times to targets at the center of gravity of an array are shorter than reaction times to targets at more peripheral locations in the array.

Additionally, human factors research has shown that, if the desired visual information is not found at the center of gravity of the array, subjects divert their attention from the center of gravity of the array to search for information of interest according to predictably search patterns informed by the arrangement of the items of visual data in the array. Specifically, it has been observed that, if the information of interest is not found at the center of gravity of the array, the subject's gaze typically moves to the upper left quadrant of the array next. To the extent the upper left quadrant of the array does not contain visual information producing a "hit" on the subject's search, the subject's gaze typically then moves on to the upper right quadrant. To the extent the upper right quadrant of the array does not contain the visual information of interest, it has been observed that the subject's gaze then moves to the lower right quadrant of the array. As a dimension of the "center of gravity" effect, it has been observed that, if the information searched for is not found in the lower right quadrant of the array, the subject's gaze often returns to the "center of gravity" (sometimes also referred to as "primary position of reference") of the array, rather than continuing to scan to the lower left corner of the array.

Put briefly, human factors research has shown that the existence of a relationship between an item's location in an array and its position in a visual search sequence by a user, and timing measurements show that objects at positions associated with later stages of a visual search sequence take more time to find.

With reference to the illustrative example of FIG. 3, the expected search pattern for a human looking for visual information of interest in array 300 would begin at first area 305, which is aligned with the physical midline of array 300 and incorporates the "center of gravity" of the region defined by boundary 301. Human factors research indicates that the expected next stop in a visual search of array 300 would be second area 310, which is situated in the upper left quadrant (dividing array 300 along its vertical and horizontal midlines) of the region defined by boundary 301. Similarly, research indicates that third area 315 comprises the likely third stop in a visual search of array 300. As shown in this non-limiting example, third area 315 is situated in the upper right quadrant (again, dividing array 300 along its vertical and horizontal midlines) of the region defined by boundary 301. Referring to the illustrative example of FIG. 3, fourth region 320, in the lower right quadrant of region defined by boundary 301 comprises the expected fourth stop in a visual search of array 300. Due to the observed "center of gravity" effect, the observed data indicates that the fifth stop in a visual search of array 300 may either be at fifth area 325, which is located in the lower left quadrant of the region defined by boundary 301, or may be a return to the "center of gravity" of the region defined by boundary 301.

While not shown in the example of FIG. 3, other factors, such as whether the visual data is presented in a form and color which a viewer associates with the information of interest have also been shown to reduce the search times and cognitive loads associated with searching an array for information of interest.

FIGS. 4A through 4D illustrate aspects of a rapidly perceivable display provided by methods and apparatus according to various embodiments of this disclosure. For convenience of reference, items common to more than one figure are numbered similarly.

From a cognitive perspective, perceiving and processing the visual information provided by a user interface typically comprises long stretches of routinely checking one or two core parameters of persistent interest (for example, speed, fuel level, and for certain vehicles, such as vehicles with manual transmissions, motor speed) to confirm that they fall within expected or legally mandated (for example, speed limits) values. These stretches are, on occasion, interrupted by periods in which a user has to take in and process visual information associated one or more vehicle systems (for example, a cooling or braking system) malfunctioning or otherwise. In a static, instrument-oriented dashboard, visual information relating to the core parameters (for example, speedometers and fuel gauges) of the vehicle's current status is provided alongside information associated with visual data of rarer interest to a user (for example, a battery gauge or odometer). As a result, during normal operation, a user's visual search for information relating to core parameters may be slowed down by the presence of other, similar looking instruments and a weak "center of gravity" of the sources of visual information. Given the frequency with which users check their vehicle speed or fuel level, such an aggregate increase in search time may translate into significant amounts of time in which a user's attention is away from the road. Similarly, during component malfunction situations (for example, an overheating engine), visual information of immediate present interest may be situated in a region of the control surface associated with a latter stage of an expected visual search path of the instrument cluster. In such situations, users may repeatedly be diverting their attention from the road for extended periods to find visual information tucked away in a "forgotten corner" of an instrument array.

Advantageously, and as discussed herein, certain embodiments according to this disclosure, organize and present vehicle data on a display in a cognitively optimized manner, which reduces the expected number of steps (and by implication, the time spent focusing on a user interface, rather than the road) to find visual information of interest to the current operating context of the vehicle. Some embodiments according to the instant disclosure effect these improvements in visual scan times across a wide range of operating contexts—including, without limitation, normal vehicle operation (for example, cruising on a highway with a full tank of gas) to emergency situations (for example, multiple component faults).

Figure 4A:
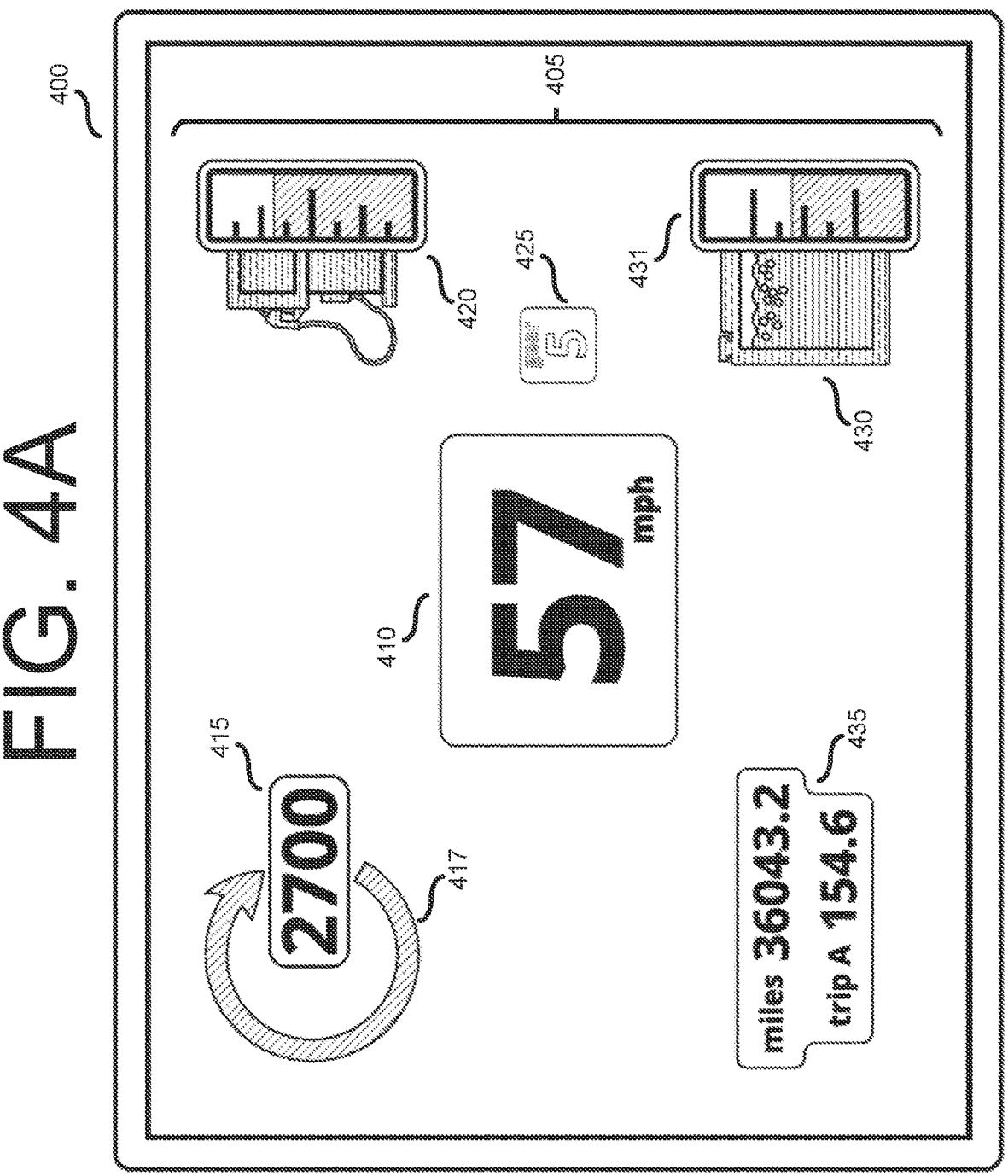
FIGS. 4A through 4D illustrate aspects of a rapidly perceivable display provided by methods and apparatus according to various embodiments of this disclosure.

Referring to the non-limiting example of FIG. 4A, a display (for example, display 105 in FIG. 1, or display 201 in FIG. 2) is shown in the figure. In this illustrative example, display 400 corresponds to a user interface in a motor vehicle whose current operational context is associated with a heightened load on the transmission (for example, a truck or sport utility vehicle pulling a trailer along a hilly road), but otherwise operating normally.

As shown in this non-limiting example, display 400 is displaying a plurality of status datums in a hierarchical array 405. As used in this disclosure, the term "hierarchical array" encompasses an array of items of visual information (for example, numbers or graphics associated with dimensions of the current operational state of a vehicle) whose location and appearance in display 400 reflect the information's current priority within a hierarchy of items of visual information.

According to some embodiments, hierarchical array 405 comprises first status datum 410, which occupies the position associated with the "center of gravity" of the visual space provided by display 400. As discussed with reference to FIG. 3 of this disclosure, first status datum 410's location along the horizontal and vertical centerlines of display 400 position it at the expected first point of a user's visual search of display 400. According to certain embodiments, the processor, microcontroller, or other apparatus implementing the control logic for display 400, obtains vehicle data (for example, from a vehicle speed sensor) from a plurality of sensors of the vehicle, and determines, for some or all of the vehicle data, status datums. As used in this disclosure, the term "status datum" encompasses a visual representation (for example, a graphic, a set of numbers, an item of text, or combinations thereof) associated with an item of vehicle data, to be presented to a motor vehicle operator via a display. As an example, a thermostat in an engine cooling system may provide, as vehicle data, a current value of 250 degrees Fahrenheit. The upper end of the normal range of operating temperatures for many engines is approximately 220 degrees Fahrenheit, meaning that the vehicle data is associated with an overheating condition. In some embodiments, a status datum associated with a coolant thermostat temperature of 250° F. could be a graphic of a bright red thermometer. In certain embodiments, a status datum associated with coolant thermostat temperature of 250° F. could be a flashing number "250."

In certain embodiments according to this disclosure, status datums comprise one or more of conditional status datums, comparison status datums, estimation status datums, and reference status datums.

As used in this disclosure, the term "conditional status datum" encompasses a visual representation of vehicle data associated with a binary status (e.g., information which is cognitively processed as being either "true" or "false"). Examples of conditional status datums include, without limitation, a "broken lightning bolt" graphic associated with a dead battery, or as discussed with reference to FIG. 4B, a flashing graphic of a set of gears associated with a transmission condition. In many cases, conditional status datums can be processed with the fewest number of perceptual and cognitive steps.

As used in this disclosure, the term "comparison status datum" encompasses a visual representation of vehicle data associated with a value according to a standard. From a cognitive perspective, comparison status datums are processed quantitatively, for example, by comparing one's current speed of 57 miles per hour against a 55 mph speed limit.

As used in this disclosure, the term "estimation status datum" encompasses a visual representation of vehicle data in reference to an ideal. From a cognitive perspective, estimation status datums are, as their name suggests, processed to arrive at an estimated state of the system (for example, a "cool" engine, or a "mostly empty" gas tank).

As used in this disclosure, the term "reference status datum" encompasses a fact about the status of the vehicle or one of its systems, which occupies a location in display 400 associated with a least-visited point in an expected visual search of hierarchical array 405.

In this illustrative example, first status datum 410 is a comparison datum of the vehicle's current speed, providing a numerical expression of the vehicle's current speed. Given central role of speed control in ensuring safe and lawful operation of the vehicle, the numerical value of the vehicle's current speed is given the highest priority location, which is associated with an expected first stop in a visual search of hierarchical array 405. In some embodiments, to assist a user in rapidly perceiving and understanding the information of first status datum 410, first status datum 410 may be colored or otherwise presented in a way that facilitates its being understood as a conditional datum (for example, by showing the digits of the vehicle's speed in green when the vehicle is under the speed limit, yellow when slightly over, and red when above a threshold value, such as ten (10) miles per hour over the posted speed limit).

In various embodiments according to this disclosure, hierarchical array 405 comprises second status datum 415, which is located in an upper left quadrant of the visual space provided by display 400. As noted with reference to FIG. 3 of this disclosure, second status datum 415 occupies a space in display 400 which is up, and to the left of the "center of gravity" of display, and accordingly, is positioned at the second stop in an expected visual search pattern of display 400. As previously noted, FIG. 4A illustrates display 400 as it appears during normal operation of the vehicle, where the principal piece of information a user typically needs to know about the vehicle is whether the vehicle is traveling at a lawful speed. In this context, the next most important piece of information to an operator is the engine's speed, as too low of an engine speed may be associated with stalling or inefficiency, and excessive engine speed may be associated with inefficiency and potential overload conditions of the engine or other components of the vehicle. Accordingly, in this example, the vehicle's speed is indicated by first status datum 410, and the vehicle's engine speed is indicated by second status datum 415.

As shown in the explanatory example of FIG. 4A, second status datum 415 is a comparison datum, wherein the current speed of the engine (expressed in revolutions per minute) is indicated. To assist a user in comprehending the information provided by second status datum 415, a color-coded graphic (in this case, circular arrow 417) may be provided as part of second status datum 415. For example, when the engine speed is associated with a normal range (for example, above a stall speed and well below the engine's redline), circular arrow 417 may be colored green. Similarly, if the engine speed is approaching either the engine's redline or expected stall speed, circular arrow 417 may be colored yellow. Likewise, if the engine speed exceeds the redline or drops below an expected stall speed, circular arrow 417 may turn red.

Referring to the non-limiting example of FIG. 4A, a third status datum 420 is situated in the upper right quadrant of display 400, in a location human factors research shows as being associated with the third expected stop of a visual search of display 400. According to various embodiments, when the vehicle is operating in a normal condition, the third most important piece of data, after vehicle speed and engine speed is the vehicle's fuel (or in the case of electric vehicles, electrical charge) level. As shown in this non-limiting example, third status datum 420 is an estimation datum, comprising a pump icon and a colored "sight glass" providing a rapidly perceivable estimate of the current value of the item of vehicle data relative to an ideal and/or problem condition. In this case, the ideal is a full tank of gas, and the problem condition is an empty fuel tank. In this example, third status datum 420 shows the current status as being significantly closer to the ideal than the problem condition. To expedite comprehension, third status datum 420 may be color coded green to reflect the current acceptable condition, and transition to yellow and red as the vehicle data associated with the fuel tank status converges upon values associated with the gas tank being empty.

As shown in the explanatory example of FIG. 4A, while in certain embodiments according to this disclosure, hierarchical array 405 five (5) status datums, embodiments according to this disclosure are not so limited, and embodiments with more or fewer status datums presented in a hierarchical array are within the contemplated scope of this disclosure. Similarly, in certain embodiments according to this disclosure, the number of status datums presented in hierarchical array 405 is increased or decreased according to the operating context of the vehicle. According to certain embodiments, an optional status datum 425 showing which gear the vehicle is currently in may be provided in a location between the expected third and fourth points of a visual search pattern of hierarchical array 405. In this non-limiting example, optional status datum 425 is a comparison datum showing the current gear. In certain contexts, such as where a four-wheeled motor vehicle is operating under heightened engine or transmission load, or where a two-wheeled vehicle is operating under conditions where, if the bike were to stall, the rider might face the challenge of an uphill start, the control logic for display 400 determines that the gear selection comprises vehicle data of sufficient priority to be included in hierarchical array 405.

In some embodiments according to this disclosure, a fourth status datum 430 occupies a location of hierarchical array 405 associated with the lower right quadrant of the visual space of display 400. Recalling the discussion of observed visual search patterns with reference to FIG. 3 of this disclosure, fourth status datum 430 occupies a location in hierarchical array 405 which a user would be expected to "hit" after first focusing on the "center of gravity" of the array, followed by the upper left quadrant, and then the upper right hand quadrant of the array. According to certain embodiments, fourth status datum 430 comprises an estimation datum based on vehicle data associated with the measured temperature of the coolant in the radiator of the motor vehicle. In this example, to facilitate rapid perception and understanding, fourth status datum 430 comprises a graphic of tank of coolant and a color coded "sight glass" 431 providing an estimate of the current engine temperature relative to a problem condition (e.g., too high of a temperature). As shown in the figure, the engine temperature occupies the middle of a visualized temperature range, below problem values near the top of the range shown in "sight glass" 431. Accordingly, the fill region of sight glass 431 is colored green, to facilitate rapid perception of the problem-free present condition of the vehicle's engine.

As previously noted, the status datums of hierarchical array 405 are dynamically determined, and in certain embodiments (for example, towing a trailer or other situations associated with an increased transmission load) a status datum associated with the state of a component not shown in the figure, such as a transmission, or traction control system may be presented only when determined to be a priority. For example, in contexts where the roads are icy and slippery, a status datum associated with the operation of a vehicle's traction control systems may be determined to be of sufficiently high priority to be included in hierarchical array 405. Certain embodiments according to this disclosure determine the priority of status datums based, at least in part, according to the foreseeable risks of the vehicle's current operating context. For example, on a cold, icy day, the risk of losing control due to poor traction may be determined to be a significant operating risk.

As noted with reference to the discussion of FIG. 3, human factors research demonstrates, that after focusing on item(s) in the lower right hand corner of an array, a user's visual search may either return to the center of gravity (for example, to first area 305 in FIG. 3) of the display, or to the lower left quadrant of the array (for example, fifth area 325 in FIG. 3). Put differently, human factors research has shown that the lower left quadrant of an array comprises a late, and discretionary point in a user's expected visual search pattern. According to certain embodiments, fifth status datum 435 is provided as part of hierarchical array 405 in a location in the lower left quadrant of display 400. According to certain embodiments, fifth status datum 435 is a reference datum indicating the total vehicle mileage and current trip mileage.

Certain embodiments according to the present disclosure facilitate the provision of relevant information in a cognitively efficient manner across a range of operating contexts ranging from normal operation to fault conditions by dynamically adjusting the placement and presentation of status datums as conditions change. Specifically, and as discussed with reference to FIGS. 4B-4D, certain embodiments optimize the content of hierarchical array 405 by variously promoting and demoting status datums in response to changes in operating context.

Figure 4B:
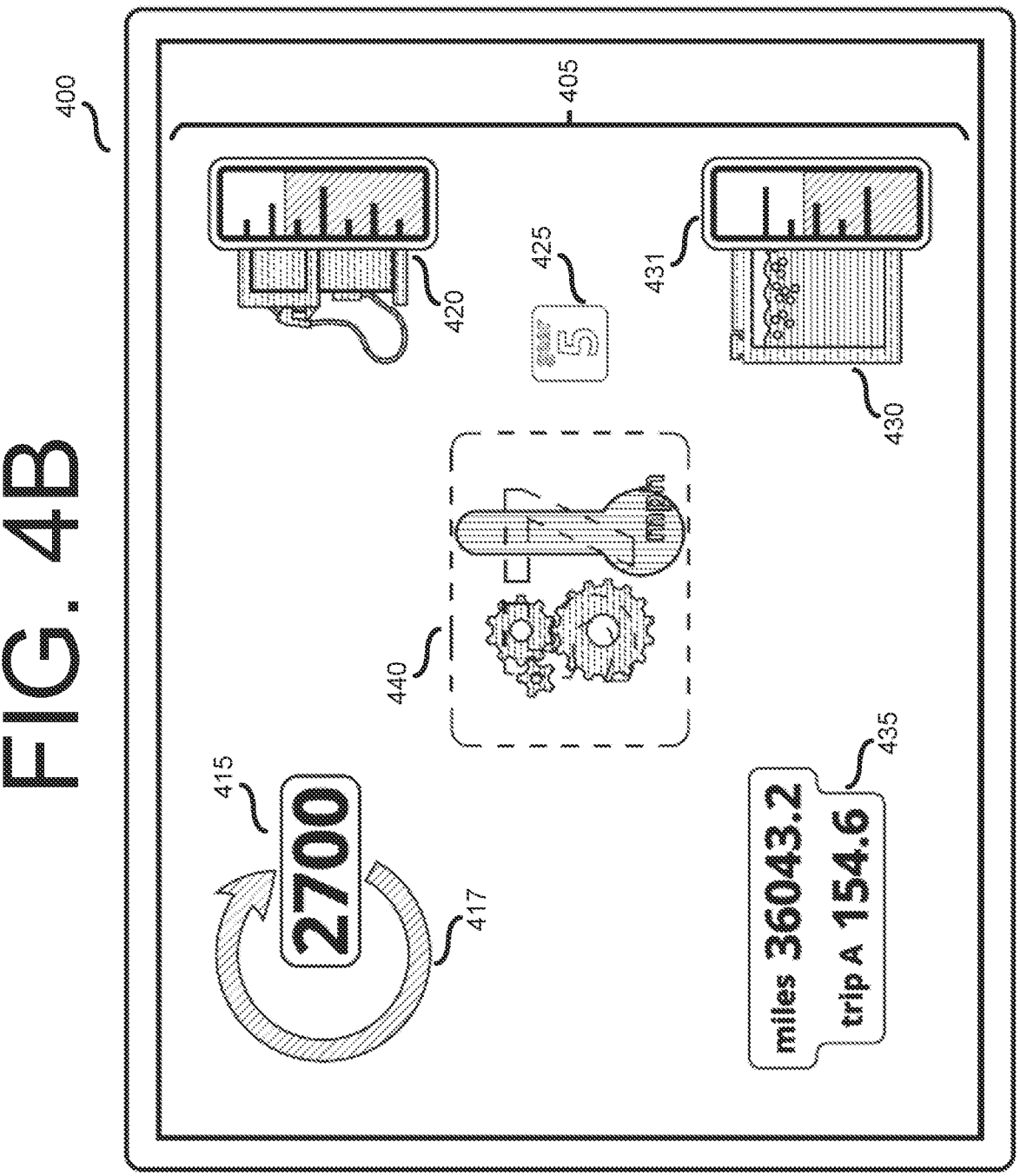

FIG. 4B illustrates a view of display 400 and hierarchical array 405 as it appears in response to vehicle data indicating a change in the relative priority of the information to be provided to the vehicle operator. As previously noted, in the example of FIG. 4B, the motor vehicle associated with display 400 is operating under circumstances which place a heightened load on the transmission, such as pulling a trailer or driving on mountainous roads. In the illustrative example of FIG. 4B, display 400 as it appears at a time subsequent to the time represented in FIG. 4A is illustrated. At the time the vehicle's transmission is trending towards an overheating condition in response to operating in fifth gear.

Referring to the non-limiting example of FIG. 4B, the apparatus implementing the control logic for display 400 (for example, controller 200 in FIG. 2) has obtained sensor data showing that the temperature of the transmission coolant is trending up. Depending on the vehicle and circumstances, a buildup of heat in the transmission can be a rapidly evolving problem with serious consequences, such as causing the vehicle to break down if the operator does not downshift or take other curative action to reduce the load on the transmission. In this example, the control logic determines a status datum 440 (in this case, a condition datum comprising a set of gears with a thermometer) associated with the new vehicle data, and determines a current priority value for status datum 440. Given the potential severity of the situation and the possibility that, if addressed early, a vehicle breakdown due to transmission failure can be avoided, status datum 440 is determined to share the location associated with the highest priority (i.e., the "center of gravity") within hierarchical array 405 with first status datum 410. According to certain embodiments, status datum 440 and first status datum 410 share the "center of gravity" by having status datum 440 "flash through" first status datum 410 at a predetermined frequency (for example, once every second) for a predetermined interval. In this way, status datum 440 is positioned and presented in a way that can be perceived and understood by the operator as rapidly as possible.

Figure 4C:
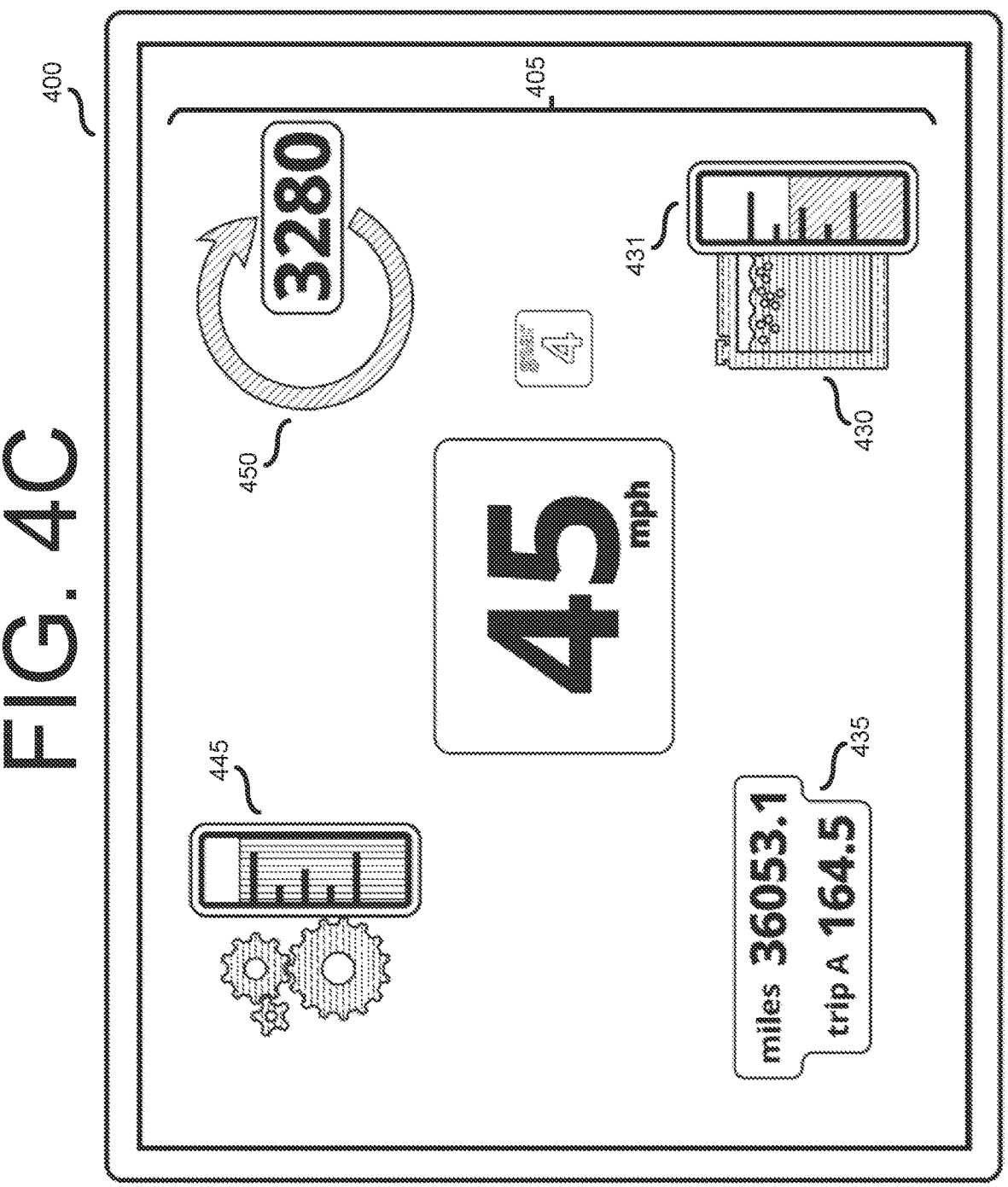

FIG. 4C illustrates an example of promotion and reordering status datums of hierarchical array 405 in response to newly obtained vehicle data.

Referring to the non-limiting example of FIG. 4C, display 400 is shown as it appears at some time subsequent to the point in time associated with FIG. 4B. In the illustrative example of FIG. 4C, the operator of the vehicle has, in response to seeing conditional status datum 440 at the "center of gravity" of display 440, downshifted from fifth gear to fourth gear. Thus, in this example, the apparatus (for example, controller 115 in FIG. 1) implementing the control logic for display 400 has received multiple items of updated vehicle data. Examples of updated items of vehicle data include, without limitation, the vehicle's measured speed, which has dropped from 57 to 45 miles per hour, the vehicle's current gear, which has changed from fifth gear to fourth gear, and the engine speed, which has increased from 2700 rpm to 3280 rpm. According to certain embodiments, the control apparatus determines a plurality of status datums based on the current vehicle data, and determines, based on the operating context of the vehicle, current priority values for each of the determined status datums.

In the non-limiting example of FIG. 4C, while the vehicle operator has downshifted to a lower gear in response to status datum 440 in FIG. 4B, the current vehicle data indicates that the transmission temperature is in a warning condition. Accordingly, an estimation datum 445 associated with the current value of the transmission temperature relative to a danger point is promoted to the position previously occupied by second status datum 415 in FIG. 4A. In this illustrative example, estimation datum 445 occupies a location on display 400 associated with an expected second stop in a visual search for data in hierarchical array 405. To facilitate rapid perception, the current level section of estimation datum 445 is colored red (as indicated by the vertical hatching lines) to reflect the fact that the transmission temperature remains problematically high, and as such, requires a portion of the driver's available attention.

Additionally, in the illustrative example of FIG. 4C, the status datum for engine speed has been moved to the upper right quadrant of display 400, to the location occupied by third status datum 420 in FIG. 4A. Given the current operating context of the vehicle, the fuel level information provided as third status datum 420 in FIG. 4A has been temporarily "demoted" from hierarchical array 405, to reflect the fact that, given the current operational context of the vehicle, the engine speed, and temperatures of the transmission and engine are significantly more relevant to safely operating the vehicle than the current fuel level. In this way, certain embodiments according to this disclosure, organize and present information of immediate interest to the vehicle operator in an uncluttered manner which reflects the operator's instant needs. In this example, the priority of fourth status datum 430 and fifth status datum 435 is unchanged, and these datums remain at their previous positions within hierarchical array 405.

Figure 4D:
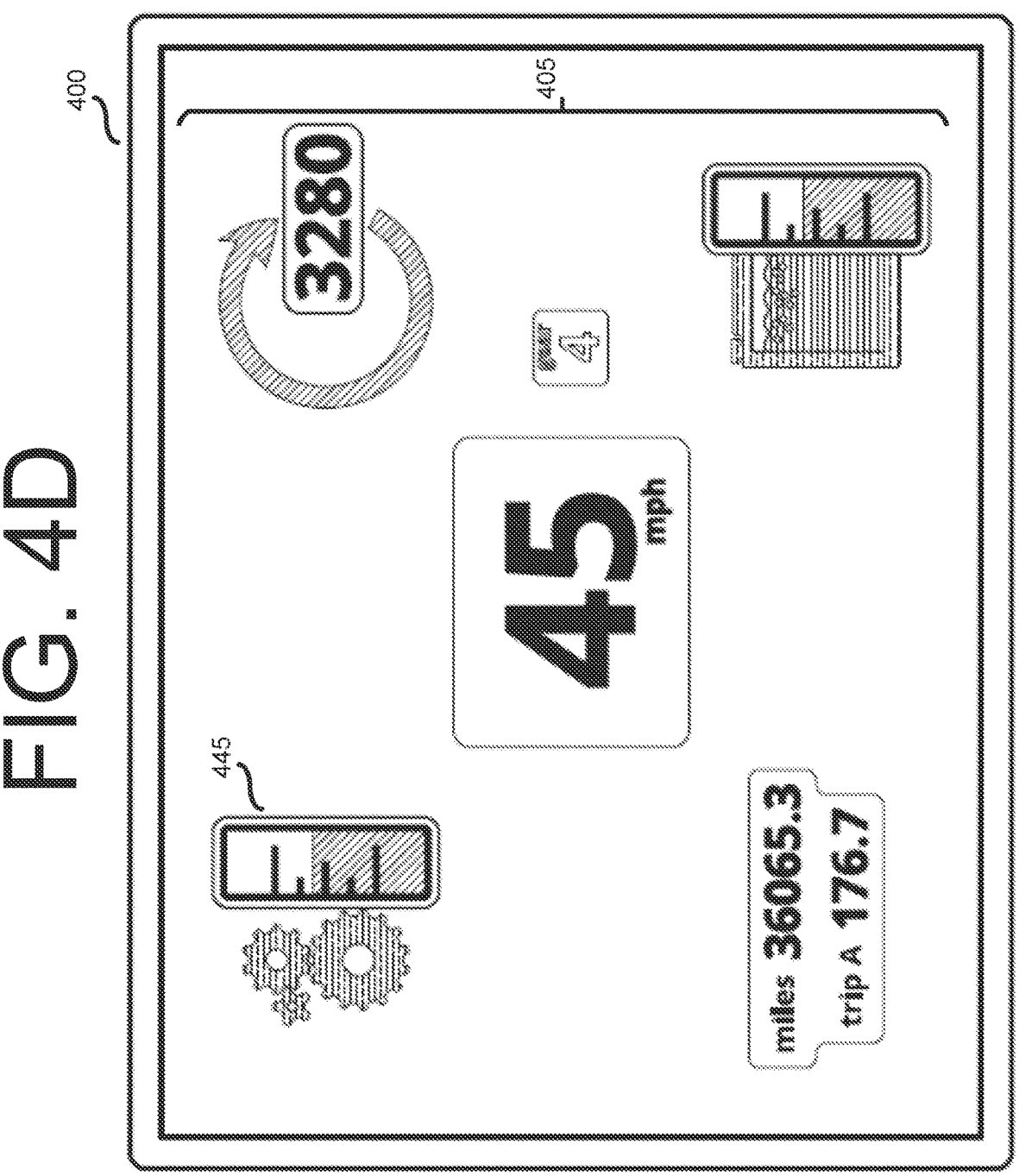

FIG. 4D illustrates a view of the display as it appears at a time subsequent to the view provided in FIG. 4C. In the non-limiting example of FIG. 4D, the operator's decision to timely downshift in response to status datum 440 has had the desired effect of lowering the transmission temperature out of a danger range. Accordingly, the apparatus implementing control logic for display 400 has, in response to obtaining temperature sensor data showing a cooler transmission, determined a new appearance for estimation datum 445. As shown in this non-limiting example, the "sight glass" of estimation datum 445 is colored green (as shown by the diagonal hatching). According to certain embodiments, after a predetermined condition indicating that the operational context of the vehicle has returned to normal operation is satisfied (for example, obtaining transmission temperature measurements within a normal range for a specified amount of time), the relative priorities of the status datums associated with the vehicle data revert back to the priorities shown with reference to FIG. 4A.

While aspects of methods and apparatus for providing a cognitively optimized user interface for a motor vehicle have thus far been discussed with reference to handling fault conditions, or other instances where something is, or potentially is, wrong with one or more systems of the vehicle, embodiments according to this disclosure are not so limited. Normal operation of a motor vehicle presents numerous opportunities for unnecessarily prolonged visual searches of a user interface to confirm aspects of the current status of the vehicle. For example, the status of accessory functions of the vehicle, such as cruise control or controls for driving modes (such as a "sport" or "comfort" modes for the suspension) are, in many vehicles, not indicated on the dashboard, or are indicated on a separate panel well below the driver's sight line on the road. For example, in some cars, whether the cruise control is set or running is not actively indicated, and the driver must infer the engagement of the cruise control system from the "feel" of the vehicle, or in some cases, looking at the position of a stalk switch. Both of these approaches are cognitively inefficient and require that the driver divert attention from the road to determining the current status of the cruise control. Similarly, certain vehicles provide operators with the option of configuring parameters of the suspension and/or shift points, to provide a "sport" mode (wherein the suspension is stiffer and/or upshifts are postponed to higher engine speeds) and a "normal" mode (wherein the suspension is softer, and upshifts occur at lower rpms, reducing cabin noise). In many such vehicles, the selected mode is not indicated in a dashboard instrument cluster, but rather, on a separate display, such as for an entertainment or navigation system. Accordingly, to determine the current "mode" of the vehicle, the operator has to divert their attention away from the road to a secondary screen, which, in many cases, requires looking down towards a center console.

FIGS. 5A-5C provide an example illustrating how certain embodiments according to this disclosure provide a cognitively optimized display of information related to accessory functionalities during "normal" operation of a motor vehicle. For convenience of reference, elements common to more than one figure are numbered similarly.

Referring to the non-limiting example of FIG. 5A, a display 500 (for example, display 201 in FIG. 2) according to certain embodiments of this disclosure as it appears at an initial point in time is shown in the figure. As shown in this illustrative example, display 500 comprises a hierarchical array 505. According to certain embodiments, hierarchical array comprises a plurality of status datums whose locations in hierarchical array 505 correspond to their current priority value. For example, a first status datum 510, comprising a comparison datum indicating the vehicle's current speed, occupies a location at the "center of gravity" of hierarchical array 505 corresponding to the expected starting point for a visual search of hierarchical array 505 for information of interest to a user. A second status datum 515, comprising a color-coded comparison datum indicating a current rpm value and the presence or absence of a warning or fault condition, occupies a location in the upper left quadrant of display 500, which corresponds to an expected second stop in a visual scan of hierarchical array 505. A third status datum 520, comprising an estimation datum indicating the state of the fuel level relative to an ideal (for example, a completely full gas tank) occupies a location in the upper right quadrant of display 500 associated with a third step in a visual scan of hierarchical array 505 subsequent to scanning second status datum 515. According to certain embodiments, hierarchical array 505 also comprises fourth status datum 525, which, in this example, is an estimation datum indicating the temperature of the engine relative to a problem state (in this case, an overheating condition). In some embodiments according to this disclosure, hierarchical array 505 also comprises fifth status datum 530, which in this example, is a reference datum indicating the vehicle's total mileage and trip mileage. In this example, fifth status datum 530 is positioned in the lower left quadrant of display 500, at a location associated with a later, and/or discretionary point of an expected search pattern of hierarchical array 505.

FIG. 5B illustrates display 500 at a point in time subsequent to the instant represented in FIG. 5A, wherein the vehicle's operator has set the vehicle's current speed of 65 miles per hour as a cruise control speed. According to certain embodiments, the user's input (for example, through buttons provided on a steering wheel or on a control stalk) setting a cruising speed to be maintained by the cruise control, also creates vehicle data, which can be obtained (for example, by sensor interface 235 in FIG. 2) by the apparatus (for example, controller 200 in FIG. 2) executing the control logic for display 500. According to various embodiments, one or more status datums can be determined based on vehicle data associated with control inputs received during operation of the vehicle. In the illustrative example of FIG. 5B, the control logic determines a conditional datum 535, comprising a frame in a first color (in this example, grey, as indicated by the horizontal hatching in the figure). According to certain embodiments, the control logic determines that, given the context and possibility that a user might divert their attention away from the road to confirm whether the cruise speed has been set, the status datum associated with the "cruising speed set" status of the cruise control is of sufficient priority to temporarily share the "center of gravity" of hierarchical array 505 with first status datum 510. In this illustrative example, the presence of the neutral, grey-colored conditional datum 535 provides a rapidly perceivable indicator that the cruise control is ready for use, but is not yet running.

FIG. 5C illustrates display 500 as it appears at a point in time subsequent to the instant depicted in FIG. 5B. Referring to the non-limiting example of FIG. 5C, having set the desired cruising speed, the operator that the road conditions are suitable for using cruise control, and accordingly, engages the cruise control. According to certain embodiments, the user's input engaging the cruise control, like her input setting the cruising speed generates vehicle data, which can be obtained by a controller, and from which a status datum can be determined. In this example, the controller determines status datum 540 as a visual indicator corresponding to vehicle data indicating that the cruise control has gone from a "set" or ready, state (such as shown in FIG. 5B) to actively controlling the speed of the vehicle to maintain a speed of 65 miles per hour. As shown in the illustrative example of FIG. 5C, status datum 540 comprises a conditional datum presented as a frame in a second color (for example, green, as indicated by the diagonal hatch lines in the figure). According to certain embodiments, the logic determines that, for at least a brief period of time, status datum 540 is of sufficient priority to share the "center of gravity" of hierarchical array 505 with first status datum 510. Given the potential for disrupting the vehicle's place in the flow of traffic arising from an operator taking their foot off of the accelerator without the cruise control, the high priority of status datum 540 makes sense. As illustrated by the examples of FIGS. 5A through 5C, certain embodiments according to this disclosure provide a cognitively optimized, contextually aware solution for alleviating cognitive bottlenecks associated with presenting operators with a wide variety of species of vehicular information.

FIG. 6A illustrates operations of an example of a method 600 for providing a rapidly perceivable display of vehicle data according to various embodiments of this disclosure.

Referring to the illustrative example of FIG. 6A, at operation 605, an apparatus implementing control logic for providing a user interface (for example, controller 115 in FIG. 1 or controller 200 in FIG. 2) obtains, via a sensor interface (for example, interface hub 120 in FIG. 1 or sensor interface 235 in FIG. 2), one or more items of vehicle data. In some embodiments according to this disclosure, items of vehicle data obtained at operation 605 comprise sensor data (for example, the output of a vehicle speed sensor, or a thermostat in a cooling system, such as an engine or transmission radiator), or data generated from a user input (for example, setting the cruise control, changing a suspension mode, or turning on exterior running lights), in particular, user inputs for which a user may seek confirmation of the input's status.

In various embodiments according to this disclosure, at operation 610, the control logic determines a plurality of status datums based on the obtained vehicle data. According to various embodiments, the status datums determined at operation 610 can be conditional datums (for example, status datum 440 in FIG. 4B), comparison datums (for example, first status datum 410 in FIG. 4A), estimation datums (for example, third status datum 520 in FIG. 5A) and reference datums (for example, fifth status datum 435 in FIG. 4A). According to various embodiments, the control logic determines the status datums based at least in part on the operating context of the vehicle. For example, and as discussed with reference to the example of FIG. 4B, where the vehicle data indicates a fault or problem condition, such as with an imminently overheating transmission, a conditional datum may be determined, whereas, when the vehicle data comprises a value within a safe operating range, an estimation datum may be determined at operation 610.

As shown in the illustrative example of FIG. 6A, at operation 615, the control logic determines, for each status datum of the plurality of status datums, a current priority value. According to various embodiments, the current priority value is based on predetermined control logic prioritizing the status datums associated with the current operating context of the vehicle. According to certain embodiments, the control logic prioritizes the status datums such that status datums most closely related to the current issues facing the operator are given the highest priority For example, and as discussed with reference to the example of FIGS. 4B-4D, when the operating context of the vehicle includes a transmission overheating under load, status datums associated with the transmission temperatures and parameters (for example, engine speed, gear selection and engine temperature) related to the load on the transmission, are of higher priority than the current fuel level. Put simply, in a condition where the transmission is overheating, and the vehicle is in imminent danger of breaking down, information indicating that the vehicle will run out of fuel in a hundred miles is immaterial and distracting to an operator.

Referring to the non-limiting example of FIG. 6A, at operation 620, the apparatus causes the determined status datums to be displayed in a hierarchical array (for example, hierarchical array 405 in FIG. 4A) on a display of the device. According to certain embodiments, the hierarchical array consists of the status datums determined, based on the current operating context of the vehicle, to have the highest current priority values of the plurality of status datums. Further in some embodiments according to this disclosure, each status datum of the hierarchical array occupies a location in the displayed hierarchical array corresponding to its current priority value. For example, when the operating context of the vehicle is one of normal operation, precise adherence to the speed limit (as it is theoretically possible to receive a speeding ticket for being only slightly over the speed limit) is the chief concern, and a comparison datum indicating the present speed of the vehicle occupies a location (for example, the "center of gravity") associated with the starting point of a visual search of the hierarchical array.

FIG. 6B illustrates further operations of methods of providing a rapidly perceivable display of vehicular data according to certain embodiments of this disclosure. The operations described with reference to FIG. 6B can, in certain embodiments, be performed in conjunction with operations of other methods of providing a rapidly perceivable display of vehicular data, such as method 600 described with reference to FIG. 6A.

Referring to the non-limiting example of FIG. 6B, at operation 650, the apparatus implementing control logic obtains second vehicle data via the sensor interface. According to certain embodiments, the apparatus obtains second vehicle data from all of the sensors and user input devices which provide vehicle data. In some embodiments, the apparatus checks for updates or changes in the output of the sources and user input devices providing vehicle data, and pulls second vehicle data from only those sensors and input devices whose output has changed. In certain embodiments, at operation 650, the apparatus automatically obtains second vehicle data from certain sensors (for example, the vehicle speed sensor) and obtains second vehicle data from other sources only if their output has changed.

At operation 655, the apparatus determines, based on the second vehicle data, a plurality of updated status datums. According to various embodiments, operation 655 is performed as a wholesale recalculation of the status datums. In certain embodiments, operation 655 is performed as an iterative update, wherein status datums are only re-determined for vehicle data which has changed.

At operation 660, the apparatus determines a current priority value for each status datum. According to certain embodiments, the priority of a status datum can change, even if the underlying value of the vehicle data for the status datum has not changed. As discussed with reference to the illustrative example of FIGS. 4B and 4C, while the value of the fuel level did not change, or at a minimum, did not change significantly between the instants shown in FIGS. 4B and 4C, its relative priority changed as a result of vehicle data showing a problem condition with the transmission temperature.

Finally, according to various embodiments, at operation 665, the apparatus causes an updated hierarchical array to be displayed on a display (for example, display 105 in FIG. 1).

FIGS. 7A-7D provide an example illustrating how certain embodiments according to this disclosure provide an cognitively optimized display of information related to the operation of static (or non-vehicular) attention-intensive apparatus. For convenience of cross-reference, elements common to more than one of FIGS. 7A-7D are numbered similarly.

In the illustrative examples of FIGS. 7A-7D, a cognitively optimized display for monitoring and controlling a deep well drilling rig is described. Skilled artisans will appreciate that the choice of a deep well drilling rig as a controlled system is non-limiting, and the interfaces described with reference to FIGS. 7A-7D can be adapted and utilized across a wide range of static and moving attention-intensive apparatus.

By way of background, deep well rigs are used to drill continuous bores into various layers of the Earth's mantle, typically to locate strata of the mantle containing oil, gas or other extractive products of interest. The density and porosity of the constituent layers of the mantle can frequently change as the drilling tool penetrates deeper into the earth. Certain of these layers contain highly pressurized media (for example, fluids or gases) that can, without limitation, cause explosions, pollute the environment, injure drilling workers and damage capital-intensive equipment. Unless drilling operations are managed carefully, these pressurized media can violently push to the surface through the well bore, causing injury or death to rig personnel, damage to the environment, and damage to the drilling rig and associated capital-intensive equipment.

Given the above, a deep well drilling rig presents a striking example of an attention-intensive apparatus where an operator must simultaneously monitor a large number of sensors and dynamic systems to ensure the rig is operated safely and consistent with accepted standards. Typically, the interfaces for providing the operator with situational information comprise a combination of computer displays, analog gauges, and other methods of data display. Often times, these interfaces are, like the rig itself, a collection of discrete modules, and essential information may be presented on several different panels, which do not share a common sight line. With experience and training, an operator can track and interpret the disparate datums and understand what is happening within the well bore under most circumstances. That said, even under routine or expected conditions, operation of a drilling rig is cognitively demanding. For example, the operator may, at a moment's notice, quickly need to determine if the drill has hit a geologic layer with a greater or lesser density, whether the drilling fluid, a combination lubricant, sealant and flushing medium, commonly known as "mud", is being absorbed by a porous layer, whether there is increased pressure within the bore, and many other changes. Many of these perceived changes require immediate action from the operator for safe operation to continue.

When multiple action items occur, the cognitive demands of operating a well, coupled with the inefficient and counterproductive presentation of essential information, can trigger problems associated with excess information decreasing the quality and speed with which critical decisions are made. As the inventor and others have noted, presentation of excess, or inessential information has been shown, too much information can unnecessarily increase an operator's cognitive load, and by proven implication, reduce the quality of decisions made. As cases such as the Deepwater Horizon spill have demonstrated, in practical terms, the tolerance for operator error in deep well drilling is effectively zero.

Referring to the non-limiting example of FIG. 7, a display 700 (for example, display 201 in FIG. 2) according to various embodiments is shown as it appears at an initial point in time. As shown in the figure, display 700 comprises a hierarchical array 705 of status datums of the drilling rig, whose locations in hierarchical array 705 correspond to their current priority value. In this example, a first status datum 710, is a comparison datum indicating the current value of a "hook load," corresponding to the measured weight hanging from the derrick hook (a lifting apparatus supporting a drill string comprising a drill bit, a bore casing, and drilling instruments) of the drilling rig. As noted elsewhere herein, deviations, both upwards or downwards in the measured value of the hook load relative to an expected value, can signal issues requiring operator attention. Thus, in addition to providing a quantification of the current hook load value, first status datum 710, can, in some embodiments, provide a visual cue as to the current state of the hook load value relative to an expected baseline. In many cases, the "hook load" is a leading indicator of situations requiring operator decision and action, as the expected value of the hook load can be determined, based on knowledge of the components of the drill string and well depth. Accordingly, given the utility of the measured hook load in comparison to an expected value, as a leading indicator of the operational state (i.e., whether drilling is proceeding normally, or whether the tool is experiencing mechanical or geological issues demanding immediate attention), first status datum 710 shows the current value of the hook load. In an initial absence of conditions pointing to a specific issue demanding operator attention, the current hook load occupies the center of gravity of hierarchical array 705.

At this initial time, a second status datum 715, comprising a comparison datum providing a numerical and pictographic representation of the activity of the drilling rig's mud pump occupies the second point along an operator's expected scan path of hierarchical array 705. Similar to hook load, the values of the mud pump pressure and pump rate in comparison to an expected value can be a leading indicator of the operational status of the drilling rig, as sudden variations in mud pump pressure can point to issues such as the drill entering a harder layer of the earth's mantle. Similarly, when drilling is proceeding normally, and mud is variously circulating through the system, and being absorbed into the walls of the bore to seal the well, the measured pump pressure relative to the pump speed falls within an expected range of values. Moving outside of this range of values can point to error conditions, such as blockages in the well. In the initial condition shown in FIG. 7A, second status datum 715 shows the mud pump operating at 432 p.s.i. of pressure, and 20 strokes per minute ("s.p.m."). Further, in this example, the graphic of the pump is color coded in a way that provides a visual indication of the speed and pressure measurements relative to an expected range. In this way, the comparison datum of second status datum 715 provides the operator with both granular quantitative detail regarding the current status of the pump, and a quick, easy-to-cognitively-digest expression of the mud pump's performance in comparison to an expected or normal state of operation.

Similarly, a third status datum 720, which, in this example, is an estimation datum, provides a pictographic representation of the "flow back," or quantity of mud cycled back out of the bore, occupies a third position along the scan path from the center of gravity of hierarchical array 705 to the upper left corner, and circling first status datum 710. As with, for example, the "sight glass" status datum 420 in FIG. 4A, third status datum 720 can be represented pictorially (for example, with a graphic showing the level of the flow back, and in some embodiments, a color change in the graphic).

A fourth status datum 725, which, in this example, is a comparison datum, occupies the next position along the natural scan path of hierarchical array 705, in the bottom right hand corner of the array. In this example, fourth status datum 725 is a conditional status datum comprising a pictorial element, in this case, a curved arrow in a color representative of the current condition (for example, red, yellow or green), and a number showing the speed of a drill head drilling the bore. As the drill speed is, under many circumstances, not well correlated to a danger condition (for example, a release of explosive gas or the like), this status datum is disposed within hierarchical array 705 at a relatively late point in a user's expected scan path.

A fifth status datum 730, showing the depth of the bore in feet, occupies a location in the lower right hand corner of hierarchical array 705. In this example, fifth status datum 730 is a reference datum, providing only a quantification of the current value of the drilling depth. As discussed elsewhere herein, this is a location within the scan path of a hierarchical array which is last, or sometimes omitted from an expected scan path of the array.

Figure 7B:
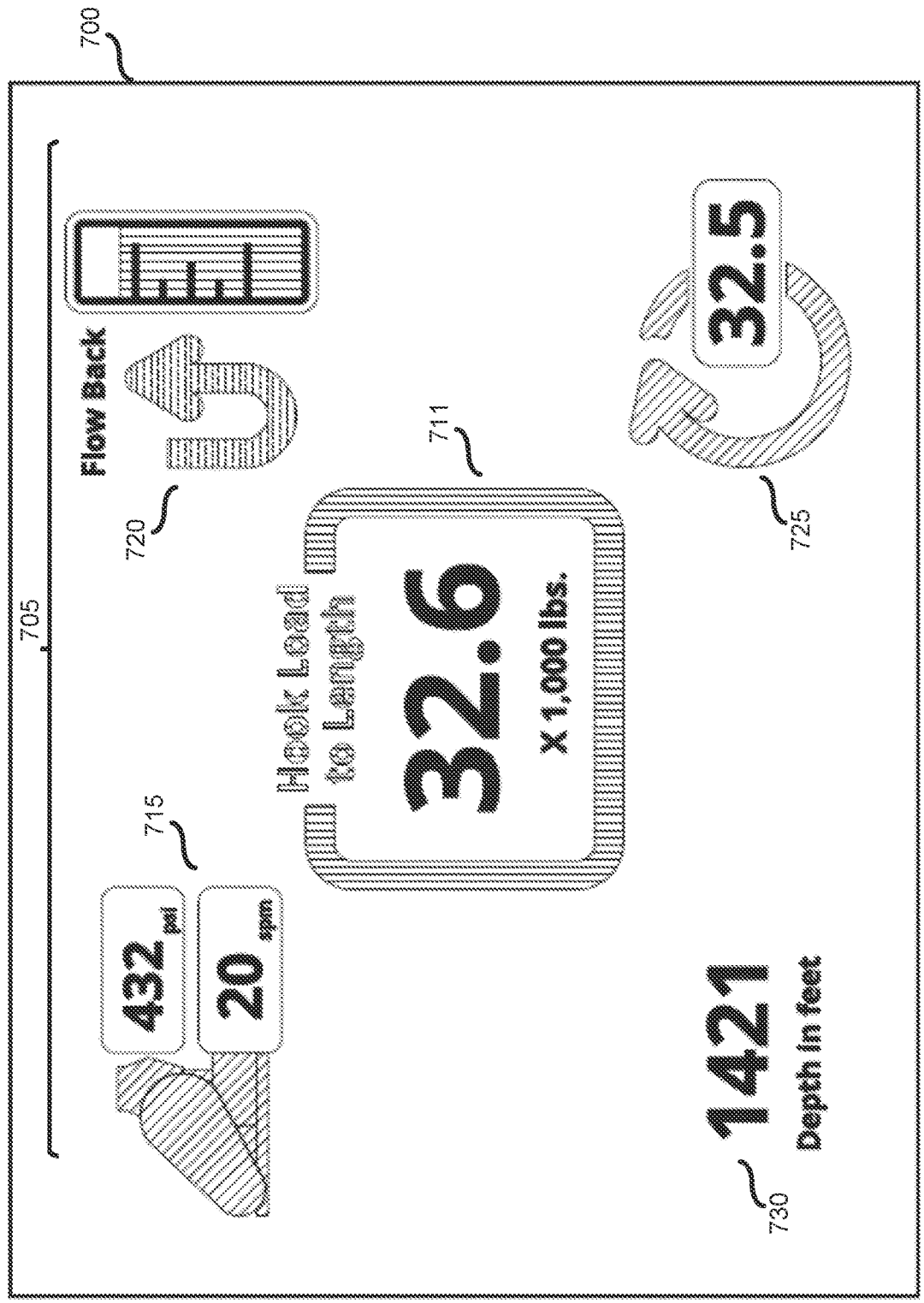

FIG. 7B shows hierarchical array 705 at a time subsequent to that shown in FIG. 7A. As shown by fifth status datum 730, the drill has progressed fifteen feet deeper than shown in FIG. 7A, and as discussed herein, a situation requiring the operator's attention has emerged.

In the illustrative example of FIG. 7B, first status datum 710, second status datum 715, third status datum 720, fourth status datum 725 and fifth status datum 730 occupy the same positions as in the initial state shown in FIG. 7A, but, the values of first status datum 710 and third status datum 720 have changed, reflecting a possible fault condition. Specifically, in the example of FIG. 7B, the value of the hook load has dropped, which can be correlative of dangerous conditions, such as a buildup of gas pushing up on the drill string of the drilling rig, or breakage of the drill string. Similarly, a higher than expected value of the hook weight can signal that some part of the drill string has become "trapped" in the drill bore, or is otherwise experiencing a condition increasing the measured value of the load at the derrick beyond an expected value.

Referring to the non-limiting example of FIG. 7B, due to a determination of a fault condition associated with the hook load, two status datums occupy the primary position of reference at the center of hierarchical array. While not shown in FIG. 7B first status datum 710 (as shown in FIG. 7A), which is a comparison datum showing the current value of the hook load, and comprising color-coded indicia of the current value relative to an expected value, alternates with a conditional datum 711, showing a fault condition associated with the "hook load to length value." In this case, because the system data obtained by the computing platform supporting hierarchical array 705 has detected a fault condition with the hook load, the center of gravity of hierarchical array is occupied with both a conditional and a comparative status datum, which share top priority among the items of system data of greatest immediate importance to the operator. Thus, the center of gravity of hierarchical array 705 is occupied with both granular data regarding the specific hook load, and a readily perceptible conditional status datum informing the operator that the current hook load has strayed sufficiently from an expected value as to constitute a fault condition. In this way, certain embodiments according to the present disclosure can not only reorder the position of status datums in response to system data affecting both the relative and absolute priority of the status datums. For example, hook load, as provided by first status datum 710, remains the highest priority status datum in hierarchical array 705, in FIG. 7B, but features of first status datum 710 have been adjusted to provide the most actionable information at the center of gravity of this display. For example, the hook load metric shown by first status datum 710 has changed to a per/unit number, and a colored frame 711 has been provided around first status datum 710 to provide a rapidly perceptible qualitative indicator of the hook load situation. Further, in the non-limiting example of FIG. 7B, the shading of the "sight glass" estimation datum of third status datum 720 representing the flow back level has changed color to indicate that the measured flowback is approaching a limit state, signaling a possible further issue relating to the passage of mud within the well bore.

Certain attention-intensive apparatus, including without limitation, the drilling rig described with reference to FIGS. 7A-7D of this disclosure, require that the operator rapidly analyze and diagnose critical situations that not only manifest themselves through different metrics, but whose diagnosis and solution can vary significantly from case to case. Thus, for the operators of such attention-intensive apparatus, it is essential that the right information, and to the extent possible, only the highest priority information be presented, so that the operator can focus on quickly making a correct decision, and implementing curative action. To balance the requirements of keeping the highest priority system information most readily perceptible to the operator, and at the same time, allowing the operator to control system parameters.

Figure 7C:
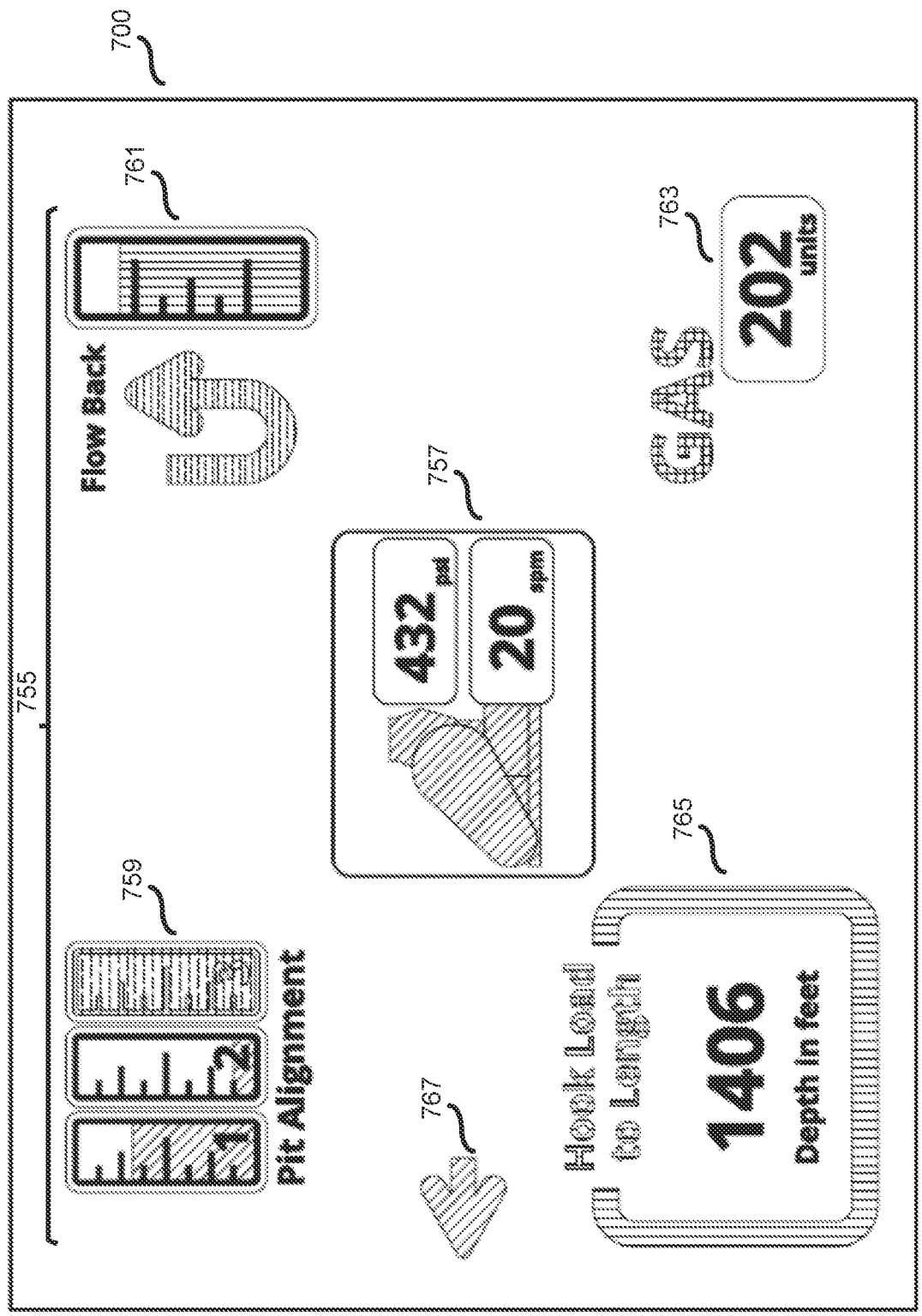

The illustrative example of FIG. 7C shows how certain embodiments according to the instant disclosure provide a significant improvement in the functionality of user interfaces for attention-intensive apparatus by providing an interface for controlling one or more parameters of the system, while, at the same time, keeping high priority information at locations within a user's natural scan path.

Referring to the non-limiting example of FIG. 7C, which shows display 700 at a time subsequent to that shown in FIG. 7B. In this example, the operator, having taken stock of the status datums presented in FIG. 7B, has, based on the information available, concluded that excess pressure from gases and other materials released from the earth is buoying, or pushing the drill string up, causing the deviation in the measured hook load in comparison to the expected value of the hook load. Recognizing that this is a situation requiring her attention, the operator presses the condition datum provided by the "hook load to length" frame in FIG. 7B, which reorders and reconfigures display 700 to provide hierarchical subarray 755.

In this example, display 700 is a touchscreen display, and status icons of a given hierarchical array (for example, hierarchical array 705 in FIG. 7B) can be touched (for example, with a finger, stylus, mouse, or other selection medium) to present one or more of a set of controls associated with the status datum or a hierarchical subarray.

In the example of FIG. 7C, in response to the operator touching, or otherwise selecting conditional datum 711 in FIG. 7B, a hierarchical subarray 755, comprising a set of status datums ordered along a scan path starting at a center point of the array, and at locations circling the center of gravity of the array, is presented. According to various embodiments, status datums of hierarchical subarray are prioritized according to their relatedness to conditional datum 711 of FIG. 7B, and priority to the overall operation of the apparatus.

For example, in FIG. 7C, mud pump status datum 757, which is a comparison datum, is positioned at the center of mass of hierarchical subarray 755, in the location of the expected start point of an operator's scan path of hierarchical subarray 757. In some embodiments, hierarchical subarray 755 is configured to also function as a control for one or more pump parameters. For example, an operator may be able to increase or decrease the pump speed by swiping up or down over mud pump status datum 757.

Still referring to the non-limiting example of FIG. 7C, a "pit alignment" status datum 759, comprising a set of estimation datums showing the current levels of "mud" in three reservoirs (also referred to as "pits") and whether the pits are "online" and circulating mud to and from the drilling rig, takes the second position in the operator's expected scan path. In this example, pit alignment, which specifies the current volume of mud in a set of reservoirs of the drilling rig, is a closely related status datum to pump speed and pressure. Under normal operation, mud circulates from an above-ground mud pump to the drilling face and back. This circulation serves a number of purposes, including removing cutting debris from the bore, and lubricating the drill. "Pit alignment" status datum 759 provides the operator with an indication of whether there is mud available to be pumped into the well, and the capacity of the pits to contain mud returning up from the well. In this example, "pit alignment" status datum 759 shows that, pit "3" is offline (as shown by the grey hatching) but at full capacity, while pit "2" is online, but almost out of mud. Pit "1" is online, and mostly full. According to some embodiments, "pit alignment" status datum 759 may be configured to allow the operator to touch the sight glass icon of the pit to configure the pump to bring pit "3" online and draw mud from pit "3" and return mud to pit "2," thereby restoring balance between the loads in each of the three mud reservoirs.

As shown in the explanatory example of FIG. 7C, an estimation datum 761 showing the level of "flow back" occupies the third priority location within hierarchical subarray 755, reflecting both its relevance to the operation of the mud pump and as a status datum indicative of the overall operational state of the drilling rig system. In this example, the "sight glass" of estimation datum 761 is significantly above the middle line of the datum, indicating that mud is flowing back (i.e., returning to surface reservoirs) at a greater rate than it is being pumped into the well.

Further, in the illustrative example of FIG. 7C, a gas status datum 763 (which, in this case is a comparison datum) provides an indication of the measured presence of gas within the bore relative to a standard, or baseline value. In this example, gas status datum 763 shows a value of 202 units, which is high in comparison to a normal value, causing the label of the comparison datum, which, in this example, reads "GAS," to be provided in color-coded letters indicating the relative severity of the gas situation.

According to certain embodiments, a conditional status datum 765, comprising a frame surrounding a comparison datum indicating numerical value of the current bore depth, are provided at a position in hierarchical subarray 755 which an operator would be expected to scan last. That said, to the extent the drill depth and hook load metrics are important barometers of many aspects of a present condition of the drilling rig, they are maintained within hierarchical subarray 755 so that the operator can find them easily, should the situation evolve unexpectedly.

As shown in this example, a back button 767 is provided away from the expected scan path of hierarchical subarray 755. By pushing back button 767, the user can return to a main hierarchical array (for example, hierarchical array 705 in FIG. 7B).

FIG. 7D illustrates an example of display 700 at a time subsequent to that shown in FIG. 7C. As noted elsewhere in this disclosure, the cognitive challenges associated with operating attention-intensive apparatus include, the possibility of multiple issues simultaneously requiring operator attention, and the fact that, in many systems, the information most relevant to the operator may be scattered across a number of plurality of user interfaces and provided as part of a cluster of gauges, certain of which contain information which is not particularly relevant to the challenge at hand. Thus, in such situations, the cognitive challenges to the operator of addressing the issue not only include correctly applying her training and experience to the relevant data, but also consciously remembering the locations of relevant data within a forest of potentially irrelevant data. As research has shown, presenting subjects with information irrelevant to a spot decision increases the risk of the subject making a bad decision. In the context of certain attention-intensive apparatus, such as oil drilling rigs, power stations and the like, failing to fully mitigate the risk of catastrophic user error is deeply indefensible.

Referring to the non-limiting example of FIG. 7D, the situation with the drilling rig, as represented by hierarchical subarray 755, has evolved from the situation shown in FIG. 7C where a differential in the measured value of a hook load relative to an estimated value was the current primary focus, to a new challenge for the operator to resolve—this time involving the performance of the mud pump as it relates to maintaining a seal of the well bore. In this illustrative example, the operator has resolved the hook load imbalance, yet issues with parameters associated with the mud pump remain. As such, hierarchical subarray has been updated such that a status datum 770 (which is again, a comparative datum) showing the pressure and speed of the mud pump, occupies the first spot in the operator's natural scan path of hierarchical subarray 755. In this illustrative example, status datum 770 comprises a color-coded indicia of the current state of the mud pump relative to an expected, or baseline state, as well as datums quantifying relevant parameters of the performance of the mud pump. Here, in the example of FIG. 7D, the color coded indicia is showing a color associated with a fault (as indicated by the cross-hatching), wherein the pump is operating rapidly (60 strokes per minute, as compared to 20 in FIG. 7C), yet the mud pressure has dropped by approximately two-thirds. In other words, conditions within the well bore are defeating normal operation of the mud pump.

Status datum 771, showing the current status of the pits for drilling mud, occupies the second spot along the operator's cognitively natural scan path for taking the information on display 700. As shown in this example, pits 1 and 2 are nearly full, while pit 3 is offline and is shown as approaching an overflow state. To the extent this condition could lead to the spillage of environmentally hazardous material, this status datum remains at a readily viewable location on display 700. Similarly, status datum 773, showing the current level of flow back, remains at the third position along the cognitively predicted scan path for the operator, as the level of flow back remains an issue predicted to be of priority to a user.

To the extent that the underlying condition causing the shortfall between pumping energy provided to the mud and the measured pressure of the mud is likely due to the presence of pressurized gas within the bore, one or more status datums of hierarchical sub-array may, in addition to providing relevant data, be configured to present a user interface for controlling one or more systems of the drilling rig associated with resealing the bore, or otherwise stemming leaks in the hydraulic circuit powered by the mud pump. For example, hierarchical subarray 755 may be configured such that, if status datum 770 is pressed by a user, controls for an annular blow out preventer, or controls to stop the rotation of the drill string, so that the operator can begin the process of resealing the well.

FIG. 8 illustrates operations of an example of a method 800 for providing a rapidly perceivable display of system data according to various embodiments of this disclosure. The operations described with reference to FIG. 8 can be performed on any suitable combination of processing platform and display apparatus, such as controller 200 and display 201 in FIG. 2.

Referring to the non-limiting example of FIG. 8, at operation 805, a processing platform (for example, system 100 in FIG. 1) obtains system data of a monitored system (for example, the drilling rig described with reference to FIGS. 7A-7D) via a sensor interface (for example, sensor interface 235 or network interface 233 in FIG. 2).

According to various embodiments, at operation 810, the apparatus determines, based on the system data, a plurality of status datums, According to some embodiments, the system determines the plurality of status datums based on the ensemble of systems or sources of providing system data.

At operation 815, the system determines, for each status datum of the plurality of status datums, a current priority value. According to some embodiments, the current priority value may be determined based on preloaded, or iteratively retrained models associating combinations of sensor data with potential situations, and outputting priorities based on the application of sensor data to the model. In some embodiments, the current priority values may be determined programmatically, based on prestored rules maintained at the apparatus.

As shown in the illustrative example of FIG. 8, at operation 820, the apparatus displays, on a device display (for example, display 700 in FIG. 7A) a hierarchical array (for example, hierarchical array 705 in FIG. 7A) of status datums at locations along a natural scan path, according to their determined priority.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus for providing a rapidly perceivable display of system data comprising:
   a processor;
   an interface to a controlled system;
   a display; and
   a memory containing instructions, which, when executed by the processor, cause the apparatus to:
   obtain system data via the interface,
   determine, based on the system data, a plurality of status datums,
   determine, for each status datum of the plurality of status datums, a current priority value, and
   display, on the display, a hierarchical array,
   wherein the hierarchical array presents a set of status datums determined to have the highest current priority values of the plurality of status datums,
   wherein the hierarchical array comprises a first location at a center of the hierarchical array,
   wherein each status datum of the hierarchical array occupies a location in the hierarchical array corresponding to its current priority value,
   wherein a status datum with the highest current priority occupies the first location at the center of the hierarchical array, and status datums with lower priorities occupy locations along a path around the first location in descending order of priority.

2. The apparatus of claim 1, wherein the plurality of status datums comprise at least one of a conditional datum, a comparison datum, an estimation datum or a reference datum.

3. The apparatus of claim 1, wherein the display is a touchscreen display, and a status datum of the hierarchical array comprises a touchscreen icon configured to present a hierarchical subarray in response to a user's touch.

4. The apparatus of claim 1, wherein the display is a touchscreen display, and a status datum of the hierarchical array comprises a touchscreen icon configured to present one or more controls associated with the status datum.

5. The apparatus of claim 1, wherein the memory further contains instructions, which when executed by the processor, cause the apparatus to:
   obtain, via the interface, from the controlled system, second system data,
   determine, based on the second system data, a plurality of updated status datums,
   determine for each updated status datum of the plurality of updated status datums, a current priority value, and
   display on the display, an updated hierarchical array,
   wherein the updated hierarchical array presents an updated set of status datums determined to have the highest current priority value of the plurality of updated status datums,
   wherein each updated status datum of the updated hierarchical array occupies a location in the updated hierarchical array corresponding to its current priority value.

6. The apparatus of claim 5, wherein the second system data is associated with a fault condition.

7. The apparatus of claim 5, wherein the memory further contains instructions, which when executed by the processor, cause the apparatus to determine the plurality of updated status datums based on the second system data and a user input received by the apparatus.

8. A method comprising:
   at an apparatus comprising a processor, an interface to a controlled system, a display and a memory, obtaining system data from the controlled system via the interface;
   determining, based on the system data, a plurality of status datums;
   determining, for each status datum of the plurality of status datums, a current priority value; and displaying, on the display, a hierarchical array,
wherein the hierarchical array presents a set of status datums determined to have the highest current priority values of the plurality of status datums,
wherein the hierarchical array comprises a first location at a center of the hierarchical array,
wherein each status datum of the hierarchical array occupies a location in the hierarchical array corresponding to its current priority value,
wherein a status datum with the highest current priority occupies the first location at the center of the hierarchical array, and status datums with lower priorities occupy locations along a path around the first location in descending order of priority.

9. The method of claim 8, wherein the plurality of status datums comprise at least one of a conditional datum, a comparison datum, an estimation datum or a reference datum.

10. The method of claim 8, wherein the display is a touchscreen display, and a status datum of the hierarchical array comprises a touchscreen icon configured to present a hierarchical subarray in response to a user's touch.

11. The method of claim 8, wherein the display is a touchscreen display, and a status datum of the hierarchical array comprises a touchscreen icon configured to present one or more controls associated with the status datum.

12. The method of claim 8, further comprising:
obtaining, via the interface, from the controlled system, second system data;
determining, based on the second system data, a plurality of updated status datums;
determining for each updated status datum of the plurality of updated status datums, a current priority value; and
displaying on the display, an updated hierarchical array,
wherein the updated hierarchical array presents an updated set of status datums determined to have the highest current priority value of the plurality of updated status datums,
wherein each updated status datum of the updated hierarchical array occupies a location in the updated hierarchical array corresponding to its current priority value.

13. The method of claim 12, wherein the second system data is associated with a fault condition.

14. The method of claim 12, further comprising:
determining the plurality of updated status datums based on the second system data and a user input received by the apparatus.

15. A non-transitory, computer-readable medium contains instructions, which, when executed by a processor cause an apparatus comprising a processor, an interface to a controlled system, and a display, to:
obtain system data from the controlled system via the interface;
determine, based on the system data, a plurality of status datums;
determine, for each status datum of the plurality of status datums, a current priority value; and
display, on the display, a hierarchical array,
wherein the hierarchical array presents a set of status datums determined to have the highest current priority values of the plurality of status datums,
wherein the hierarchical array comprises a first location at a center of the hierarchical array,
wherein each status datum of the hierarchical array occupies a location in the hierarchical array corresponding to its current priority value,
wherein a status datum with the highest current priority occupies the first location at the center of the hierarchical array, and status datums with lower priorities occupy locations along a path around the first location in descending order of priority.

16. The non-transitory, computer-readable medium of claim 15, wherein the plurality of status datums comprise at least one of a conditional datum, a comparison datum, an estimation datum or a reference datum.

17. The non-transitory, computer-readable medium of claim 15, wherein the display is a touchscreen display, and a status datum of the hierarchical array comprises a touchscreen icon configured to present a hierarchical subarray in response to a user's touch.

18. The non-transitory, computer-readable medium of claim 15, wherein the display is a touchscreen display, and a status datum of the hierarchical array comprises a touchscreen icon configured to present one or more controls associated with the status datum.

19. The non-transitory, computer-readable medium of claim 15, further comprising instructions, which, when executed by the processor, cause the apparatus to:
obtain, via the interface, from the controlled system, second system data,
determine, based on the second system data, a plurality of updated status datums,
determine for each updated status datum of the plurality of updated status datums, a current priority value, and
display on the display, an updated hierarchical array,
wherein the updated hierarchical array presents an updated set of status datums determined to have the highest current priority value of the plurality of updated status datums,
wherein each updated status datum of the updated hierarchical array occupies a location in the updated hierarchical array corresponding to its current priority value.

20. The non-transitory computer-readable medium of claim 19, wherein the second system data is associated with a fault condition.

* * * * *